United States Patent [19]

Kondo

[11] Patent Number: 5,576,772
[45] Date of Patent: Nov. 19, 1996

[54] MOTION VECTOR DETECTION APPARATUS AND METHOD

[75] Inventor: Tetsujiro Kondo, Kanagawa, Japan

[73] Assignee: Sony Corporation, Tokyo, Japan

[21] Appl. No.: 302,420

[22] Filed: Sep. 8, 1994

[30] Foreign Application Priority Data

Sep. 9, 1993 [JP] Japan ................... 5-248814

[51] Int. Cl.$^6$ .................................................. H04N 7/50
[52] U.S. Cl. .................. 348/699; 348/402; 348/413; 348/416
[58] Field of Search .................. 348/699, 402, 348/413, 416; H04N 7/50

[56] References Cited

U.S. PATENT DOCUMENTS

| | | | |
|---|---|---|---|
| 5,105,271 | 4/1992 | Niihara | 348/699 |
| 5,278,915 | 1/1994 | Chupeau | 348/413 |
| 5,347,309 | 9/1994 | Takahashi | 348/420 |
| 5,387,937 | 2/1995 | Dorricott | 348/699 |

FOREIGN PATENT DOCUMENTS

| | | |
|---|---|---|
| 0420653 | 4/1991 | European Pat. Off. . |
| 0460997 | 12/1991 | European Pat. Off. . |
| 0510972 | 10/1992 | European Pat. Off. . |
| 0520765 | 12/1992 | European Pat. Off. . |
| 2264415 | 8/1993 | United Kingdom . |

OTHER PUBLICATIONS

Globecom '92 vol. 1, Dec. 1992 Orlando, Fl. USA, pp. 320–324, Lee et al. 'A fast feature matching algorithm of multi-resolution motion estimation' p. 320, left col., line 1—p. 322, left col., line 11.

*Primary Examiner*—Howard W. Britton
*Attorney, Agent, or Firm*—William S. Frommer; Alvin Sinderbrand

[57] ABSTRACT

Using a multi-stage operation, a motion vector is detected between a base block in a present frame and the best matching position of an inspection block in a reference frame. In an initial stage, constant and transient components, such as a mean value and a standard deviation, are extracted from the base block and compared with constant and transient components extracted from the inspection block as its position is varied through a predetermined search range. A coarse motion vector to a first best matching block in the predetermined search range is obtained. In a next stage, the base block is formed into small blocks, and the inspection blocks at positions in the neighborhood indicated by the coarse motion vector are formed into small blocks. Constant and transient components for each of the small blocks are obtained and compared. A next motion vector to a second best matching block in the neighborhood indicated by the coarse motion vector is obtained. In a final stage, image data for the base block and the inspection blocks at positions in the neighborhood indicated by the next motion vector are compared to obtain a final motion vector.

50 Claims, 19 Drawing Sheets

FIRST HIERARCHICAL STAGE

SECOND HIERARCHICAL STAGE

THIRD HIERARCHICAL STAGE

Fig. 2A
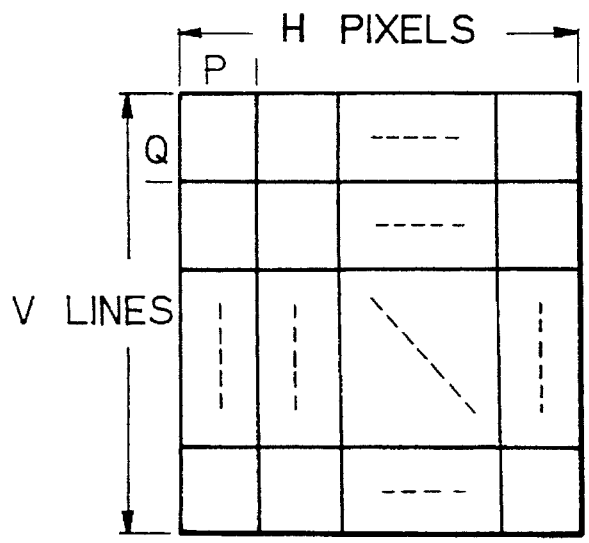
Fig. 2B
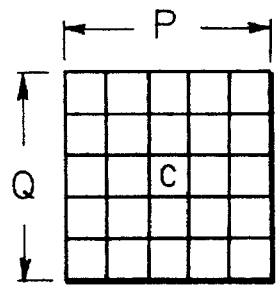
Fig. 3A  Fig. 3B  Fig. 3C
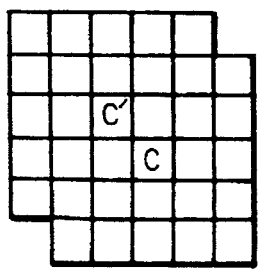 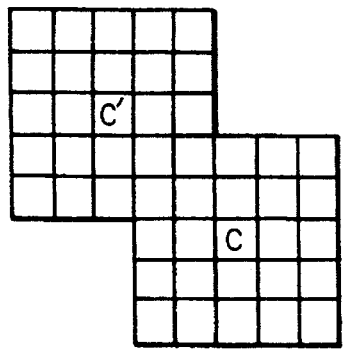 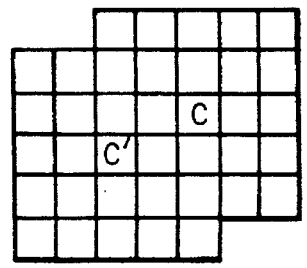
Fig. 4
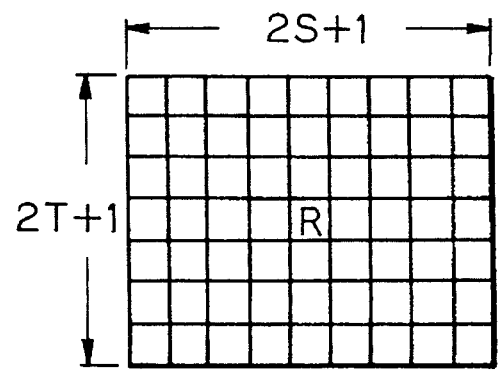

Fig. 6A

| 124 | 125 | 125 | 124 | 125 | 134 | 145 | 154 |
|-----|-----|-----|-----|-----|-----|-----|-----|
| 125 | 115 | 105 | 91  | 93  | 115 | 140 | 156 |
| 118 | 101 | 89  | 102 | 143 | 173 | 190 | 189 |
| 70  | 60  | 93  | 142 | 170 | 185 | 189 | 178 |
| 164 | 163 | 167 | 173 | 172 | 171 | 170 | 163 |
| 165 | 164 | 160 | 152 | 150 | 148 | 146 | 144 |
| 140 | 149 | 153 | 149 | 149 | 146 | 141 | 136 |
| 133 | 135 | 137 | 136 | 136 | 141 | 144 | 142 |

Fig. 6B

| 122  |  | 111 |  | 117 |  | 149 |  |
|------|--|-----|--|-----|--|-----|--|
|      |  |     |  |     |  |     |  |
| 87.3 |  | 107 |  | 168 |  | 187 |  |
|      |  |     |  |     |  |     |  |
| 164  |  | 163 |  | 160 |  | 156 |  |
|      |  |     |  |     |  |     |  |
| 139  |  | 144 |  | 143 |  | 141 |  |
|      |  |     |  |     |  |     |  |

Fig. 6C

| 3.63 |  | 13.3 |  | 12.8 |  | 6.25 |  |
|------|--|------|--|------|--|------|--|
|      |  |      |  |      |  |      |  |
| 22.3 |  | 17.8 |  | 12.4 |  | 4.25 |  |
|      |  |      |  |      |  |      |  |
| 0.5  |  | 7    |  | 11.3 |  | 10.8 |  |
|      |  |      |  |      |  |      |  |
| 5.25 |  | 7.25 |  | 4.5  |  | 2.38 |  |
|      |  |      |  |      |  |      |  |

Fig. 7A

| 125 | 125 | 124 | 125 | 134 | 145 | 154 | 163 |
|-----|-----|-----|-----|-----|-----|-----|-----|
| 115 | 105 | 91  | 93  | 115 | 140 | 156 | 171 |
| 101 | 89  | 102 | 143 | 173 | 190 | 189 | 185 |
| 60  | 93  | 142 | 170 | 185 | 189 | 178 | 172 |
| 163 | 167 | 173 | 172 | 171 | 170 | 163 | 154 |
| 164 | 160 | 152 | 150 | 148 | 146 | 144 | 138 |
| 149 | 153 | 149 | 149 | 146 | 141 | 136 | 133 |
| 135 | 137 | 136 | 136 | 141 | 144 | 142 | 140 |

Fig. 7B

| 118  |  | 108 |  | 134 |  | 161 |  |
|------|--|-----|--|-----|--|-----|--|
|      |  |     |  |     |  |     |  |
| 85.8 |  | 139 |  | 184 |  | 181 |  |
|      |  |     |  |     |  |     |  |
| 164  |  | 162 |  | 159 |  | 150 |  |
|      |  |     |  |     |  |     |  |
| 144  |  | 143 |  | 143 |  | 138 |  |
|      |  |     |  |     |  |     |  |

Fig. 7C

| 7.5  |  | 16.3 |  | 9.25 |  | 6    |  |
|------|--|------|--|------|--|------|--|
|      |  |      |  |      |  |      |  |
| 12.9 |  | 18.6 |  | 5.63 |  | 6    |  |
|      |  |      |  |      |  |      |  |
| 2    |  | 10.8 |  | 11.8 |  | 8.75 |  |
|      |  |      |  |      |  |      |  |
| 7.5  |  | 6.5  |  | 2    |  | 3.25 |  |
|      |  |      |  |      |  |      |  |

Fig. 8A

| 138 | 141 | 143 | 144 | 146 | 145 | 137 | 131 | 131 | 135 | 137 | 131 | 126 | 121 | 111 | 101 |
|---|---|---|---|---|---|---|---|---|---|---|---|---|---|---|---|
| 157 | 154 | 148 | 145 | 147 | 146 | 145 | 144 | 143 | 145 | 140 | 128 | 116 | 107 | 103 | 103 |
| 153 | 150 | 144 | 139 | 139 | 142 | 144 | 148 | 152 | 155 | 159 | 157 | 141 | 123 | 115 | 105 |
| 142 | 138 | 138 | 140 | 143 | 148 | 153 | 156 | 158 | 165 | 166 | 162 | 156 | 148 | 136 | 117 |
| 152 | 147 | 139 | 134 | 131 | 131 | 139 | 140 | 140 | 140 | 136 | 135 | 132 | 130 | 124 | 112 |
| 153 | 153 | 154 | 158 | 153 | 150 | 147 | 144 | 149 | 152 | 155 | 157 | 149 | 145 | 139 | 124 |
| 175 | 180 | 187 | 190 | 190 | 191 | 189 | 181 | 174 | 171 | 170 | 172 | 171 | 174 | 170 | 153 |
| 151 | 151 | 152 | 153 | 157 | 166 | 170 | 172 | 175 | 176 | 176 | 175 | 175 | 179 | 177 | 170 |
| 119 | 124 | 124 | 125 | 125 | 124 | 125 | 134 | 145 | 154 | 163 | 170 | 174 | 177 | 171 | 162 |
| 126 | 130 | 125 | 115 | 105 | 91 | 93 | 115 | 140 | 156 | 171 | 179 | 179 | 178 | 168 | 153 |
| 121 | 124 | 118 | 101 | 89 | 102 | 143 | 173 | 190 | 189 | 185 | 180 | 174 | 170 | 155 | 139 |
| 131 | 101 | 70 | 60 | 93 | 142 | 170 | 185 | 189 | 178 | 172 | 167 | 162 | 157 | 142 | 128 |
| 195 | 178 | 164 | 163 | 167 | 173 | 172 | 171 | 170 | 163 | 154 | 152 | 146 | 136 | 121 | 107 |
| 170 | 165 | 165 | 164 | 160 | 152 | 150 | 148 | 146 | 144 | 138 | 137 | 133 | 127 | 115 | 113 |
| 152 | 140 | 140 | 149 | 153 | 149 | 149 | 146 | 141 | 136 | 133 | 133 | 133 | 130 | 125 | 131 |
| 148 | 136 | 133 | 135 | 137 | 136 | 136 | 141 | 144 | 142 | 140 | 138 | 138 | 136 | 138 | 144 |

Fig. 8B

|   |   |   |   |   |   |   |   |   |   |   |   |   |   |   |   |
|---|---|---|---|---|---|---|---|---|---|---|---|---|---|---|---|
|   |   |   |   |   |   |   |   |   |   |   |   |   |   |   |   |
| 145 |   |   | 158 |   |   | 113 |   |   | 156 |   |   |   |   |   |   |
|   |   |   |   |   |   |   |   |   |   |   |   |   |   |   |   |
| 145 |   |   | 159 |   |   | 126 |   |   | 153 |   |   |   |   |   |   |
|   |   |   |   |   |   |   |   |   |   |   |   |   |   |   |   |
| 148 |   |   | 160 |   |   | 171 |   |   | 144 |   |   |   |   |   |   |
|   |   |   |   |   |   |   |   |   |   |   |   |   |   |   |   |
| 121 |   |   | 152 |   |   | 162 |   |   | 130 |   |   |   |   |   |   |
|   |   |   |   |   |   |   |   |   |   |   |   |   |   |   |   |
|   |   |   |   |   |   |   |   |   |   |   |   |   |   |   |   |

Fig. 8C

|   |   |   |   |   |   |   |   |   |   |   |   |   |   |
|---|---|---|---|---|---|---|---|---|---|---|---|---|---|
| 4.91 |   |   | 12.5 |   |   | 15.2 |   |   | 14.4 |   |   |   |   |
|   |   |   |   |   |   |   |   |   |   |   |   |   |   |
| 4.05 |   |   | 17.9 |   |   | 24.2 |   |   | 10.1 |   |   |   |   |
|   |   |   |   |   |   |   |   |   |   |   |   |   |   |
| 11.5 |   |   | 14.1 |   |   | 12.3 |   |   | 7.85 |   |   |   |   |
|   |   |   |   |   |   |   |   |   |   |   |   |   |   |
| 13.4 |   |   | 19.6 |   |   | 12.1 |   |   | 8.67 |   |   |   |   |

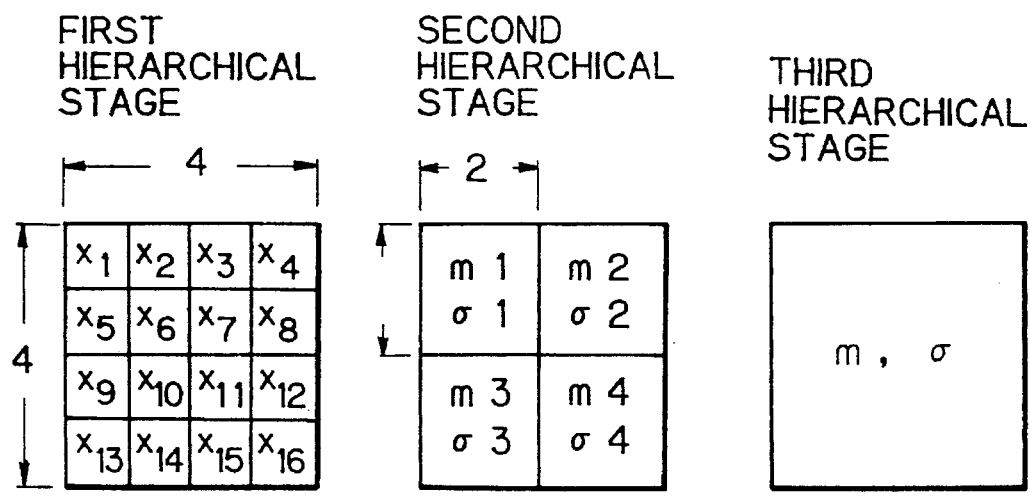
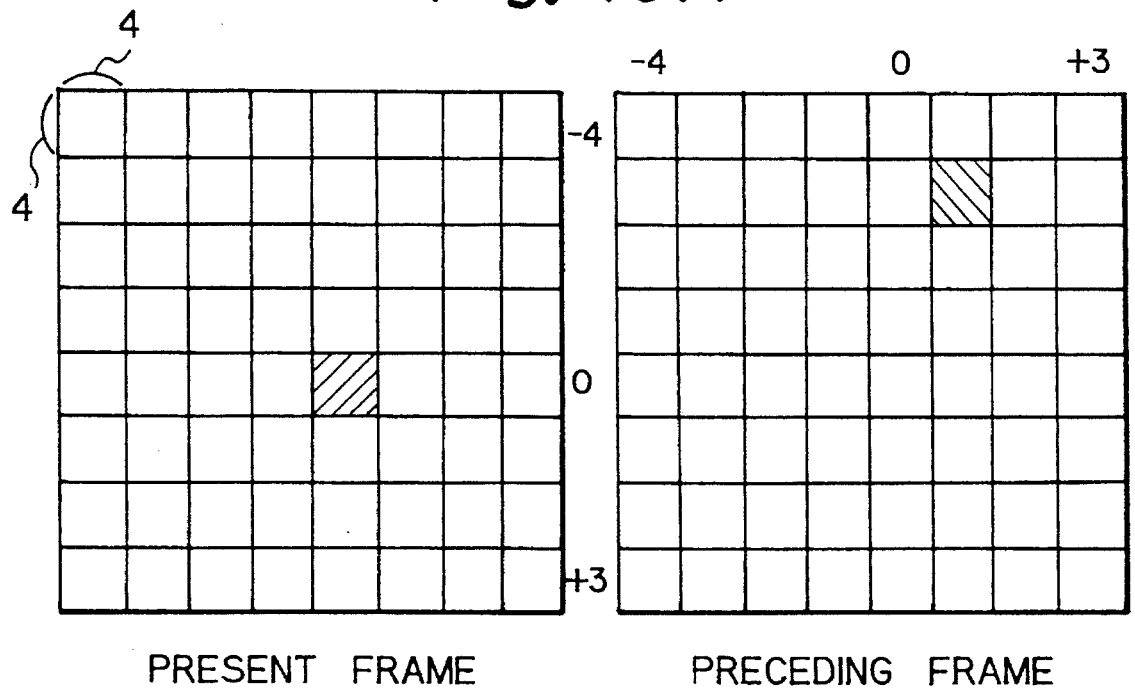
MOTION VECTOR (1, -3) IN THIRD HIERARCHICAL STAGE

Fig. 10B
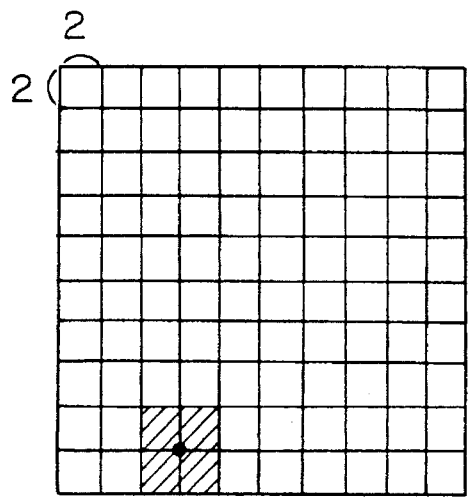 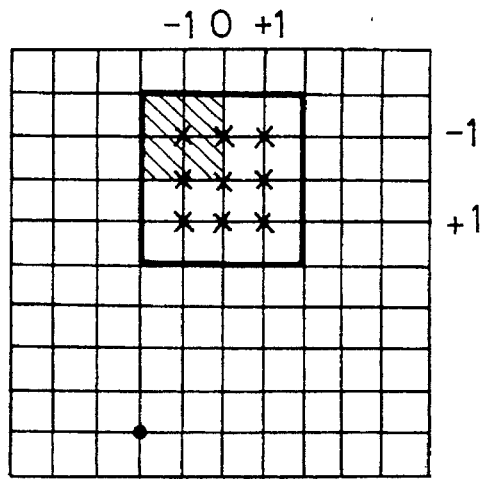
PRESENT FRAME          PRECEDING FRAME
MOTION VECTOR (-1,-1) IN SECOND HIERARCHICAL STAGE
(2,-6) + (-1,-1) = (1,-7)
Fig. 10C
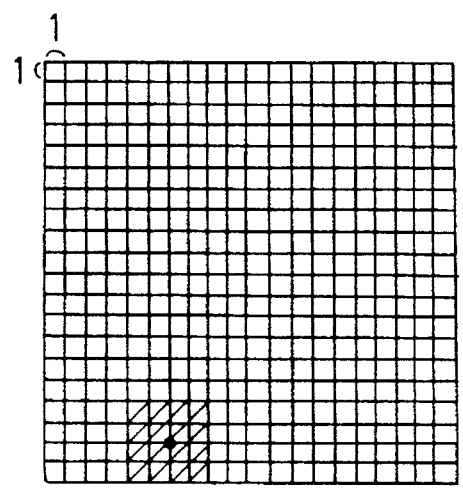 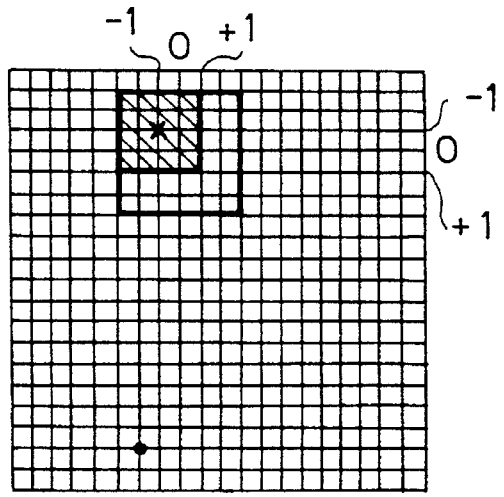
PRESENT FRAME          PRECEDING FRAME
MOTION VECTOR (-1,-1) IN FIRST HIERARCHICAL STAGE
(2,-14) + (-1, 1) = (1,-15)

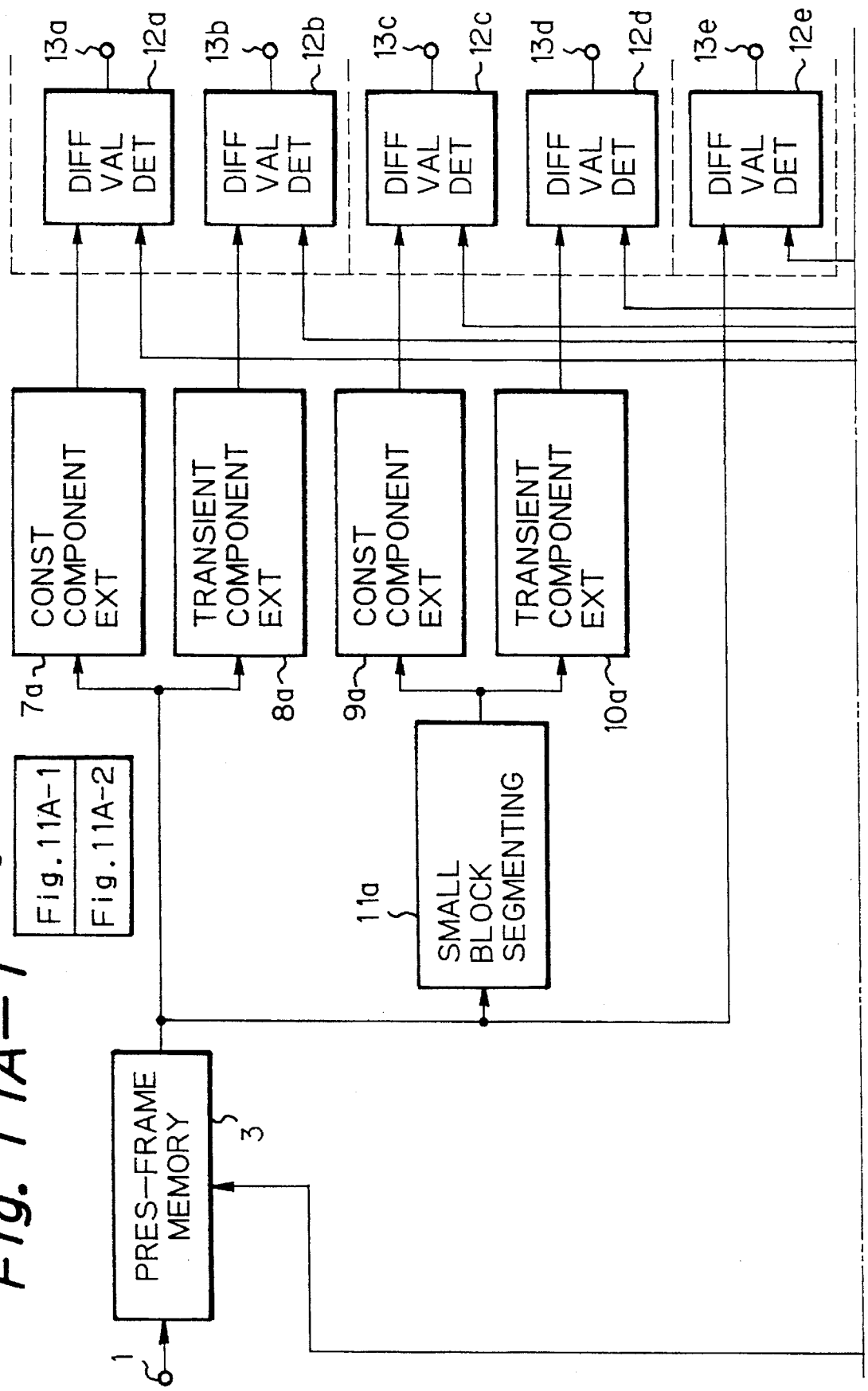

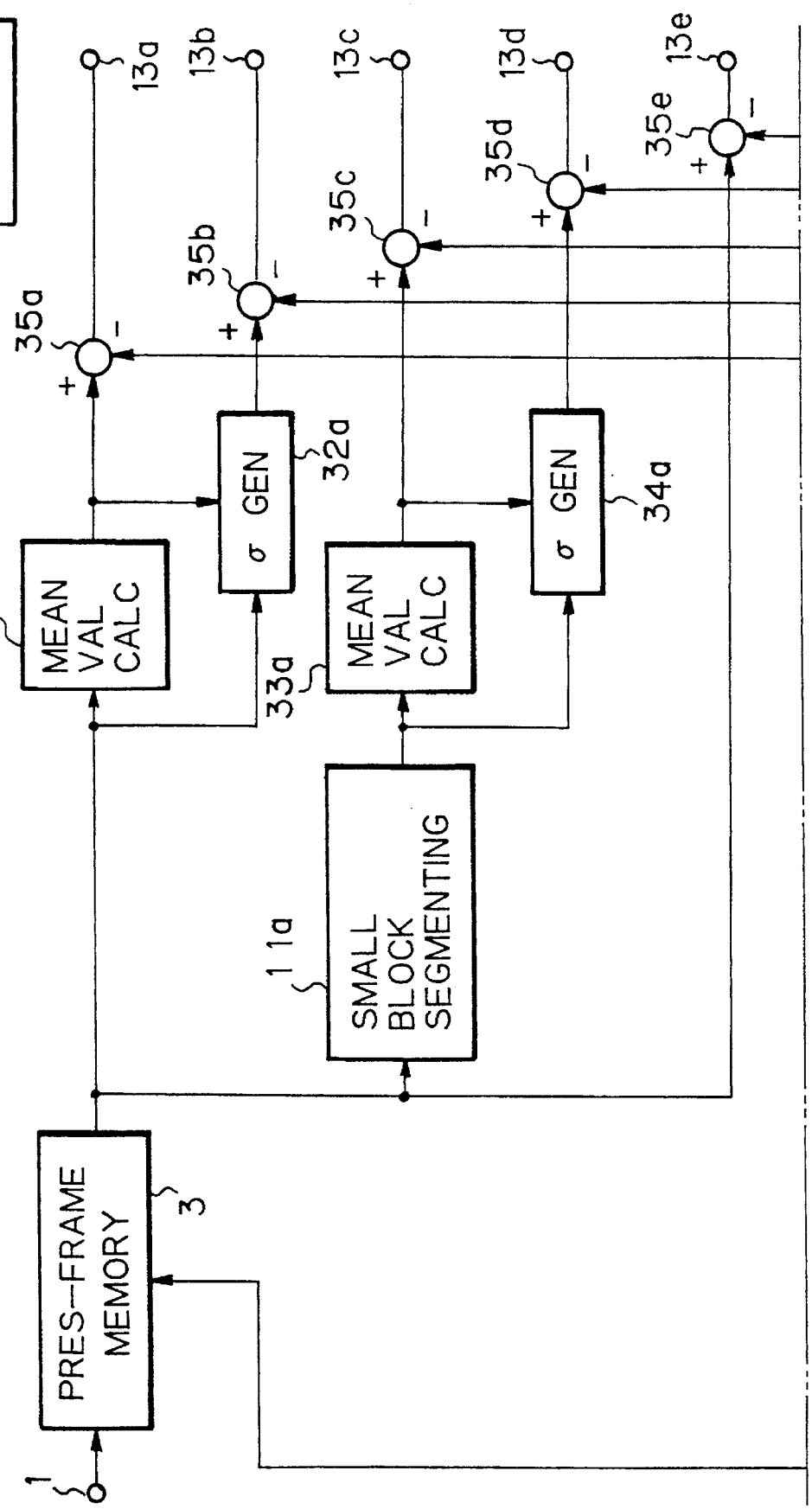

MOTION VECTOR DETECTION APPARATUS AND METHOD

BACKGROUND OF THE INVENTION

The present invention relates to detection of a motion vector between a block in an image and a corresponding block in another image, and, more particularly, is directed to reducing the number of operations required to detect a motion vector while maintaining the accuracy of the detected motion vector.

Motion vectors are useful in predictive coding of a series of digital images, which reduces the amount of information needed to represent the series of images. For example, the Moving Picture Coding Experts Group (MPEG) international standard for highly efficient coding of moving pictures employs orthogonal transformation, specifically a discrete cosine transformation (DCT), and predictive encoding with motion compensation.

FIG. 1 shows an example of a predictive encoding circuit using motion compensation. Digital video data for a present frame of video is supplied to input terminal 61, which supplies the digital video data to a motion vector detecting circuit 62 and a subtracting circuit 63.

The motion vector detecting circuit 62 detects a motion vector for a block of the present frame relative to a reference frame, which may be a frame that temporally precedes the present frame, and supplies the motion vector to a motion compensating circuit 64.

Frame memory 65 is adapted to store an image such as the preceding frame which, when motion compensated, forms the prediction for the present image, and to supply this image to the motion compensating circuit 64.

The motion compensating circuit 64 is operative to perform motion compensation of the image supplied thereto from frame memory 65 using the motion vector supplied thereto from the motion vector detecting circuit 62, and to supply the motion compensated image to a subtracting circuit 63 and an adding circuit 66. Specifically, the circuit 64 moves each block of the image to the position indicated by the corresponding motion vector.

The subtracting circuit 63 subtracts the motion compensated preceding frame received from the motion compensating circuit 64 from the video data of the present frame, on a pixel by pixel basis, to produce differential data and supplies the differential data to a DCT circuit 67.

The DCT circuit 67 functions to orthogonally transform the differential data to produce coefficient data, and applies the coefficient data to a quantizing circuit 68 which is adapted to quantize the coefficient data and to supply the quantized coefficient data to an output terminal 69 and to an inverse quantizing circuit 70.

The inverse quantizing circuit 70 recovers the coefficient data from the quantized coefficient data, and applies the recovered coefficient data to an inverse DCT circuit 71 which converts the coefficient data to decoded differential image data and supplies the decoded differential image data to the adding circuit 66.

The adding circuit 66 adds the decoded differential image data to the motion compensated image data from the circuit 64 to produce decoded image data and applies the decoded image data to the frame memory 65 for storage therein.

The operation of motion vector detection performed by the motion vector detection circuit 62 will now be described with reference to FIGS. 2–4.

The motion vector detecting circuit 62 uses a block matching method to detect motion vectors. In the block matching method, an inspection block of a reference frame is moved in a predetermined searching range to identify the block in the predetermined searching range that best matches a base block of the present frame. The motion vector is the difference between the co-ordinates of the base block and the co-ordinates of the best matching block in the reference frame.

FIG. 2A shows an image of one frame comprising H horizontal pixels×V vertical lines, which are divided into blocks of size P pixels×Q lines. FIG. 2B shows a block in which P=5, Q=5, and "c" represents the center pixel of the block.

FIG. 3A shows a base block of a present frame having a center pixel c and an inspection block of a reference frame having a center pixel c'. The inspection block is positioned at the block of the reference frame which best matches the base block of the present frame. As can be seen from FIG. 3A, when the center pixel c of the base block is moved by +1 pixel in the horizontal direction and +1 line in the vertical direction, the center pixel c is co-located with the center pixel c'. Thus, a motion vector (+1, +1) is obtained. Similarly, for the positions of the best matching block relative to the base block shown in FIGS. 3B and 3C, respective motion vectors of (+3, +3) and (+2, −1) are obtained. A motion vector is obtained for each base block of the present frame.

The predetermined search range through which the inspection block is moved in the reference frame may be ±S pixels in the horizontal direction and ±T lines in the vertical direction, that is, the base block is compared with an inspection block having a center pixel c' that varies from a center pixel c of the base block for ±S pixels in the horizontal direction and ±T lines in vertical direction. FIG. 4 shows that a base block R with a center pixel c of a present frame should be compared with {(2S+1)×(2T+1)} inspection blocks of a reference frame. In FIG. 4, S=4 and T=3. The searching range of FIG. 4 is a region consisting of the centers of each of the inspection blocks. The size of the searching range that contains the entirety of the inspection blocks is (2S+P)×(2T+Q), i.e., ((P−1)/2+(2S+1)+(P−1)/2)× ((Q−1)/2+(2T+1))+(Q−1)/2).

The comparison of a base block with an inspection block at a particular position in the predetermined search range comprises obtaining evaluating values,such as the sum of absolute values of differential values of frames, the sum of squares of differential values of frames, or the sum of n-th power of absolute values of differential values of frames, detecting the minimum of the evaluating values to identify the best matching block, and producing a motion vector between the base block and the best matching block.

FIG. 5 shows an example of the motion vector detection circuit 62.

Image data for a present frame is applied to an input terminal 81, which supplies the image data to a present frame memory 83 for storage. Image data for a reference frame is applied to an input terminal 82, which supplies the image data to a reference frame memory 84 for storage.

Controller 85 controls reading and writing of the present frame memory 83 and the reference frame memory 84 which respectively supply pixel data of a base block of the present frame and pixel data of an inspection block of the reference frame to differential value detecting circuit 87. An address moving circuit 86 is associated with the reference frame memory 84. The controller 85 controls the address moving circuit 86 to apply read addresses to the reference frame memory 84 which move, pixel by pixel, the position of the inspection block in the predetermined searching range.

The differential value detecting circuit 87 obtains the differential value between the output signals of the present frame memory 83 and the reference frame memory 84 on a pixel by pixel basis and supplies the differential values to an absolute value calculating circuit 88 which obtains the absolute value of the differential values and supplies the absolute value to an accumulating circuit 89. The accumulating circuit 89 sums the absolute values of the differential values for each block to produce an evaluating value for the base block relative to the inspection block at a particular position in the predetermined search range and supplies the evaluating value to a determining circuit 90.

The determining circuit 90 identifies the minimum evaluating value in the predetermined search range. The best matching block in the predetermined search range of the reference frame corresponds to the minimum evaluating value. The circuit 90 also produces a motion vector between the base block of the present frame and the best matching block in the predetermined search range of the reference frame.

The conventional block matching method requires a large amount of hardware and a large number of arithmetic operations. For the situation shown in FIG. 4, (P×Q) absolute values of differential values should be summed $\{(2S+1)\times(2T+1)\}$ times. Thus, the number of arithmetic operations for this process is expressed as $\{(P\times Q)\times(2S+1)\times(2T+1)\}$.

To overcome these disadvantage of the conventional block matching method, various methods have been proposed.

In the first of these proposed methods, to decrease the number of elements of a block, a method for decomposing a base block and an inspection block into small blocks in the horizontal and vertical directions and extracting a feature value for each small block has been proposed. The feature value may be, for example, the sum of the magnitudes of the pixels in the small blocks. The feature values of each of the small blocks in the horizontal direction of each of the base block and the inspection block are compared, and the feature values of each of the small blocks in the vertical direction of each of the base block and the inspection block are compared. Absolute values of the compared results are summed. The weighted mean value of the summed results is used as the evaluating values for the base and inspection blocks. This method, described in detail in U.S. application serial no. 08/283,830, filed Aug. 1, 1994, reduces the number of arithmetic operations to the number of small blocks in the horizontal and vertical directions.

In the second of these proposed methods, to simplify the searching process, in a first stage, the inspection block is moved every several pixels to coarsely detect a motion vector. In a second stage, the inspection block is moved near the position indicated by the coarse motion vector every pixel to finely detect a motion vector. This method is referred to as a two-step method. In addition, a three-step method where a motion vector is obtained in three steps is also known. In the three-step method, the number of arithmetic operations corresponding to all the pixels in the searching range can be reduced to the number of arithmetic operations corresponding to the pixels near the motion vector detected in each step.

Yet another proposed method which both decreases the number of elements of a block and simplifies the searching process, known as the thin-out method, employs a hierarchical construction. The number of pixels in a block is sampled and thinned out (for example, four pixels are thinned out to one pixel, or two pixels are thinned out to one pixel). Blocks constructed of the thinned-out pixels are compared. Thereafter, the origin of the block matching process is moved to the position of the minimum detected value. A motion vector is detected by the block matching process, pixel by pixel. As the result of the thin-out process, both the number of elements in a block and the number of arithmetic operations in the searching range decrease.

A further proposed method which both decreases the number of elements of a block and simplifies the searching process, employs a low pass filter. In this method, a hierarchical construction is defined where there are a first hierarchical stage where an original image is supplied, a second hierarchical stage where the number of pixels of the original image signal in the first hierarchical stage is thinned out by ½ in the horizontal and vertical directions with a low-pass filter and a sub-sampling circuit, and a third hierarchical stage where the number of pixels of the image signal in the second hierarchical stage is thinned out by ½ in the horizontal direction and vertical directions with a low-pass filter and a sub-sampling circuit. The block-matching process is performed for the image signal in the third hierarchical stage. The origin of the block matching process is moved to the position corresponding to the detected minimum evaluating value. The block matching process is performed for the image signal in the second hierarchical stage. The origin of the block matching process is moved to the position corresponding to the detected minimum value. The block matching process is performed for the image signal in the first hierarchical stage.

A problem with each of the above mentioned proposed methods for reducing the number of arithmetic operations in the block matching method for detecting motion vectors is that each of these methods may produce an erroneous result since the amount of information in an original image is lost due to simplification carried out by the searching process.

Specifically, when the number of elements of a block is decreased, a feature value of a small block that has been passed through a low-pass filter is used. When the searching process is simplified, since a motion vector is coarsely detected, the accuracy is low. Thus, an error may take place. When the number of elements is decreased and the searching process is simplified, since a motion vector is detected corresponding to a thinned-out image or an image that has passed through a low-pass filter, an error may take place.

OBJECTS AND SUMMARY OF THE INVENTION

Therefore, an object of the present invention is to provide a method and apparatus for detecting motion vectors which avoids the aforementioned disadvantages of the prior art.

Another object of the present invention is to provide a method and apparatus for detecting motion vectors which reduces the number of arithmetic operations relative to the conventional block matching method.

Yet another object of the present invention is to provide a method and apparatus for detecting motion vectors which can be implemented with a simple hardware construction.

A further object of the present invention is to provide a method and apparatus for detecting motion vectors which reduces the possibility of producing an erroneous result.

In accordance with an aspect of this invention, a motion vector detecting apparatus and method are provided in which image data of a base block of a first image are supplied, and a constant component and a transient component of the base block are obtained. Image data of an inspection block of a second image are supplied in response to a control signal, and a constant component and a transient component of the inspection block are obtained. The constant and transient components of the base and inspection blocks are compared to determine a first position of the inspection block in the second image which best matches the base block. Different positions in the second image are indicated as the control signal as a function of the first best matching position of the inspection block. The image data of the base block are compared with the image data of the inspection block as the position of the inspection block is varied in the neighborhood of the first best matching position to determine a second position of the inspection block in the neighborhood of the first best matching position which best matches the base block.

In accordance with another aspect of this invention, the base block and inspection block are formed into respective small blocks, and a constant component and a transient component of the respective small blocks are obtained. The constant and transient components of the small blocks of the base and inspection blocks are compared as the position of the inspection block is varied in the neighborhood of the first best matching position to determine a third position of the inspection block in the second image which best matches the base block. Different positions in the second image are indicated as the control signal as a function of the third best matching position of the inspection block. The second best matching position is determined as the position of the inspection block is varied in the neighborhood of the third best matching position.

First, second and third motion vectors are produced between the base block and the first best matching position, the base block and the second best matching position, and the base block and the third best matching position, respectively. To compensate for differences in resolution of the first, second and third motion vectors, the first motion vector is multiplied by a first predetermined factor and added to the third motion vector to produce an intermediate motion vector, which is multiplied by a second predetermined factor and added to the second motion vector to produce a final motion vector between the base block and the second best matching position.

The above, and other objects, features and advantages of the present invention will be apparent from the following detailed description of the preferred embodiments of the present invention when read in conjunction with the accompanying drawings in which corresponding parts are identified by the same reference numeral.

BRIEF DESCRIPTION OF THE DRAWINGS

FIG. 2A is a schematic diagram illustrating the blocks of an image;

FIG. 2B is a schematic diagram illustrating the pixels and lines of a block shown in FIG. 2A;

FIGS. 3A–3C are schematic diagrams illustrating motion vectors between a base block of a present frame and an inspection block of a reference frame;

FIG. 4 is a schematic diagram illustrating a predetermined search range around a base block;

FIGS. 6A–6C are diagrams illustrating the pixel values of a (8×8) region, average values of sub-areas of the region, and standard deviations of the sub-areas of the region, respectively;

FIGS. 7A–7C are diagrams illustrating the pixel values of the region of FIG. 6A, as shifted, average values of sub-areas of the shifted region, and standard deviations of the sub-areas of the shifted region, respectively;

FIGS. 8A–8C are diagrams illustrating the pixel values of a (16×16) region, average values of sub-areas of the region, and standard deviations of the sub-areas of the region, respectively;

FIGS. 9A–9C are diagrams illustrating the values representing a block in the first, second and third hierarchical stages, respectively, of production of a motion vector according to the present invention;

FIGS. 10A–10E are diagrams to which reference is made in explaining production of a motion vector according to the present invention;

FIGS. 11A-1, 11A-2 and 11B form a block diagram showing a circuit for producing a motion vector according to the present invention;

FIGS. 12A-1 12A-2 and 12B form a block diagram showing a more specific embodiment of the circuit shown in FIGS. 11A-1 11A-2 and 11B.

DETAILED DESCRIPTION OF THE PREFERRED EMBODIMENTS

Figure 1:
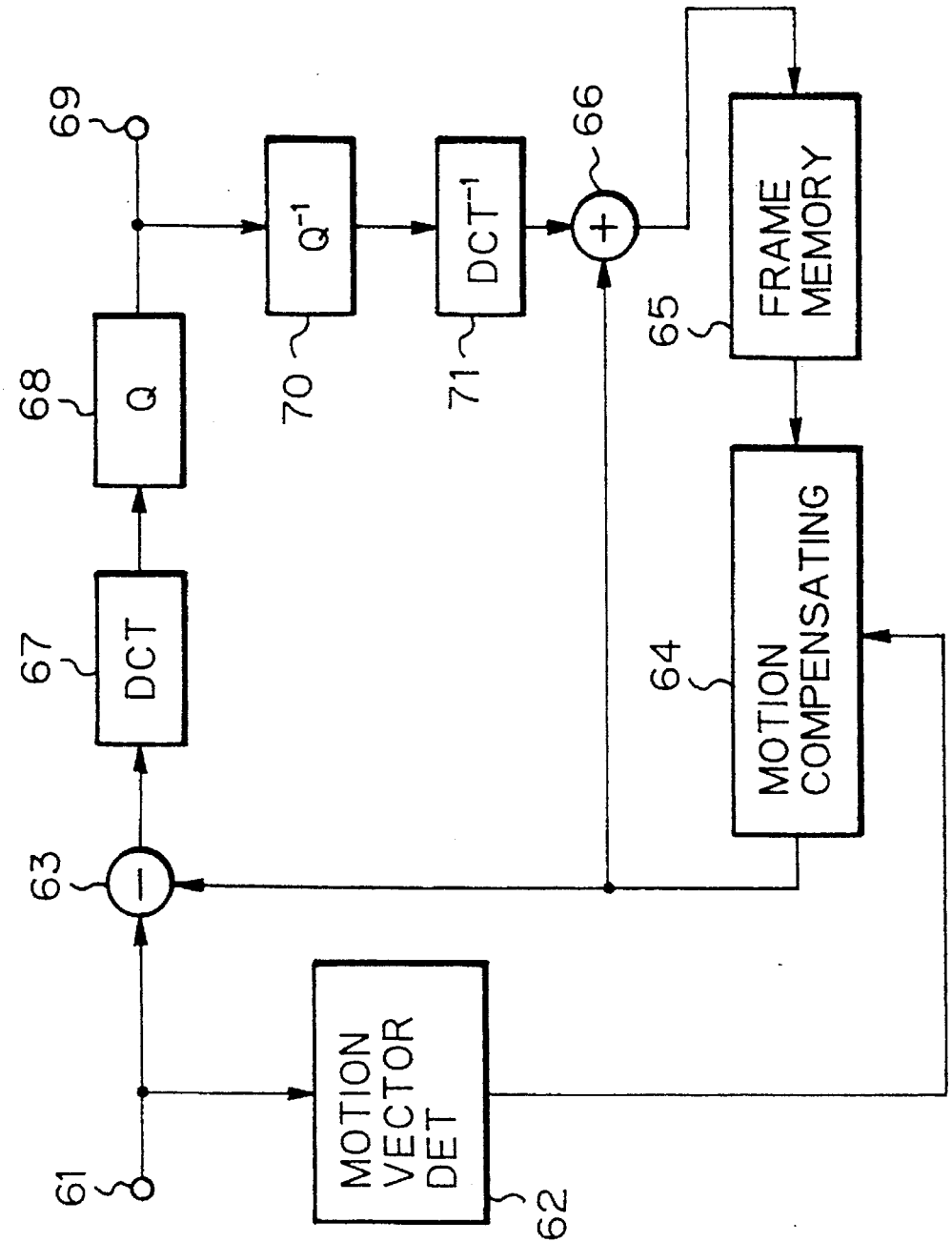
FIG. 1 is a block diagram showing a conventional predictive encoding circuit using motion compensation.
Figure 5:
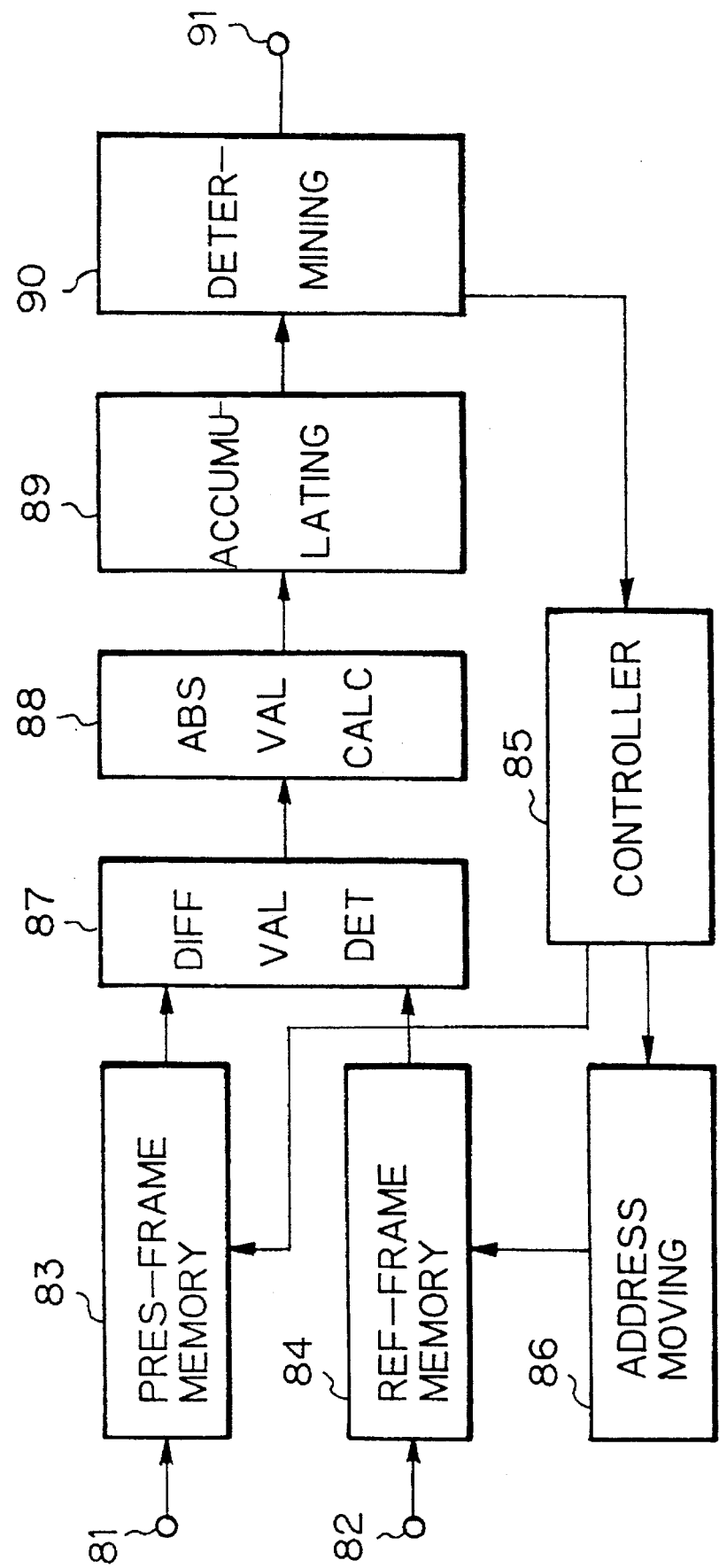
FIG. 5 is a block diagram showing a conventional circuit for producing a motion vector using a block matching method.

The prior art proposed improvements of the block matching method for detecting motion vectors produce erroneous results because too much information is lost when representing a group of pixels by a representative value, such as a feature value.

In the present invention, a group of pixels, such as a block, is represented by two values, a constant component and a transient component. This allows more of the original information to be preserved, while permitting a reduction in the number of calculations needed to determine the best matching block in the predetermined search range of the reference frame relative to the base block in the present frame. The constant and transient components of the base block and the inspection block at various positions in the predetermined search range are compared, and the best matching block is determined as a function of both the constant and transient components.

Since the number of inspection points of pixels of a block and the searching range in the present invention are remarkably decreased relative to the conventional block matching method, the number of arithmetic operations can be sufficiently reduced.

The present invention comprises a multi-stage or hierarchical approach for obtaining a motion vector. In the broadest stage, constant and transient components are evaluated for (4 pixels×4 lines) blocks of a predetermined search range and used to obtain a coarse motion vector. In the next stage, constant and transient components are evaluated for (2×2) blocks in the neighborhood indicated by the coarse motion vector and used to obtain a next motion vector. In the finest stage, the difference between pixels of a base block and an inspection block in the neighborhood indicated by the next motion vector are evaluated and used to obtain a final motion vector. That is, all but the last stage represent blocks by their constant and transient components, while the last stage examines the actual pixel values in each block. The search range for the first stage is the entirety of the predetermined search range, and is progressively narrowed so that, at the final stage, the search range is only a few pixels larger than the size of the base block in the present frame.

The constant component of a group of pixels may be, for example, one of a mean value, a low frequency component, a low order component of a set of orthogonally transformed coefficients, a maximum value, a minimum value, and so forth. The prior art proposed improvements of the block matching method represent a group of pixels using only a constant component.

The transient component of a group of pixels may be, for example, one of a standard deviation, a high frequency component, a high order component of a set of orthogonally transformed coefficients, a dynamic range, a differential value of mean values, a maximum value of differential values of mean values, and so forth. For example, if the pixels in a block have values (8, 32, 0, 20), the mean value in the block is "15" the differential value of mean values is |8−15|+|32−15|+|0−15 |+|20−15|=44, and the maximum value of differential values is |32−15|=17. Transient components represent degrees of local activities of images, that is, the degree of signal level variations or the amount of high frequency components. The prior art proposed improvements of the block matching method fail to retain information regarding the transient component of a group of pixels.

The oversimplification of the prior art proposed improvements will now be illustrated.

FIG. 6A is a table showing pixel values in a region of (8×8) pixels. These values represent signal levels (amplitudes) in a range (0 to 255) wherein eight bits represent each pixel. FIG. 6B is a table showing mean values calculated for every group of (2×2=4 pixels) which form constant component feature amounts. FIG. 6C is a table showing standard deviations calculated for every (2×2) group which form transient component feature amounts.

In FIG. 6B, mean values "164" and "163" are very close values. However, as shown in FIG. 6C, the standard deviations corresponding to the mean values "164" and "163" are "0.5" and "7" respectively, which differ greatly from each other. This is because the level variations of the two (2×2) blocks greatly differ from each other. Although the prior art proposed improvements of the block matching method would consider these (2×2) blocks to be quite similar, it is seen that they are actually dissimilar.

FIG. 7A shows a region constructed of (8×8) pixels where the leftmost column of the table shown in FIG. 6A is removed and a new column is added at the right of the table of FIG. 6A. FIGS. 7B and 7C show mean values and standard deviations calculated in the same manner as for FIGS. 6B and 6C, respectively.

In FIG. 7B, the mean values corresponding to "164" and "163" in FIG. 6B are "164" and "162" respectively. In FIG. 7C, the standard deviations corresponding to "164" and "162" shown in FIG. 6C are "2" and "10.8" respectively In this example, it is clear that the difference of the standard deviations is larger than the difference of the mean values.

FIG. 8A is a table showing pixel values in a region or block of (16×16) pixels. FIGS. 8B and 8C show mean values and standard deviations calculated in the same manner as for FIGS. 6B and 6C, respectively, except that these values are calculated for blocks of size (4×4), rather than (2×2). It will be seen that although the mean values of the two (4×4) blocks in the upper left of the (16×16) block are the same, namely "145", the standard deviations are different, namely, "4.91" and "4.05".

Thus, FIGS. 6–8 demonstrate that local features of images of (2×2) blocks of pixels or (4×4) groups of pixels cannot be adequately represented with constant component feature amounts.

Detection of a motion vector according to the present invention will now be generally described.

FIGS. 9A–9C show the representation of a (4×4) block in the first, second and third hierarchical stages, respectively. Detection of a motion vector proceeds from the third hierarchical stage to the first hierarchical stage.

The resolution or accuracy of motion vectors detected differs in each hierarchical stage. In this example, the resolution of the third hierarchical stage motion vector is four pixels in the horizontal direction and four lines in the vertical direction. The resolution of the second hierarchical stage motion vector is two pixels in the horizontal direction and two lines in the vertical direction. The resolution of the first hierarchical stage motion vector is one pixel in the horizontal direction and one line in the vertical direction.

In the third hierarchical stage shown in FIG. 9C, which is the first part of a motion vector detection operation, a constant component comprising the mean value m of the pixels in a (4×4) block and a transient component comprising the standard deviation a of the pixels in the (4×4) block are calculated as follows, where the block contains 16 pixels (elements), denoted by x1 to x16:

$$m=(x1+x2+\ldots+x16)/16$$

$$\sigma=\{\Sigma(xi-m)^2 \times \mathcal{V}_{16}\}^{1/2}$$

Assume that the position of a base block in the third hierarchical stage is (x, y) and the position of an inspection block thereof is (x+Δx, y+Δy) (where Δx and Δy represent variations of four pixels and four lines, respectively). The difference between the feature values for the base block and the inspection block can be expressed as follows:

$$Hm(\Delta x, \Delta y)=|m'(x+\Delta x, y+\Delta y)-m(x, y)|$$

$$H\sigma(\Delta x, \Delta y)=|\sigma'(x+\Delta x, y+\Delta y)-\sigma(x, y)|$$

These feature values are combined to form an evaluating value for the (4×4) inspection block relative to the base block as follows:

$$H(\Delta x, \Delta y)=(w1 \cdot Hm(\Delta x, \Delta y))+(w2 \cdot H\sigma(\Delta x, \Delta y))$$

The values of Δx and Δy corresponding to the position of the minimum evaluating value for the positions of the inspection block considered in the third hierarchical stage comprise the motion vector obtained in the third hierarchical stage.

In the second hierarchical stage shown in FIG. 9B, which is the middle part of a three stage motion vector detection operation, the original (4×4) block is segmented into four (2×2) blocks, and each (2×2) block is represented by a constant component, its mean value m, and a transient component, its standard deviation σ. The original (4×4) block is thus represented by mean values m1 to m4 and standard deviations σ1 to σ4, calculated as follows:

$$m1=(x1+x2+x5+x6)/4$$

$$m2=(x3+x4+x7+x8)/4$$

$$m3=(x9+x10+x13+x14)/4$$

$$m4=(x11+x12+x15+x16)/4$$

$$\sigma1=\{\Sigma(xi-m1)^2\times\tfrac{1}{4}\}^{1/2}$$

$$\sigma2=\{\Sigma(xi-m2)^2\times\tfrac{1}{4}\}^{1/2}$$

$$\sigma3=\{\Sigma(xi-m3)^2\times\tfrac{1}{4}\}^{1/2}$$

$$\sigma4=\{\Sigma(xi-m4)^2\times\tfrac{1}{4}\}^{1/2}$$

where $\Sigma$ represents the sum of the differences between the values of each (2×2) block and the mean value of the (2×2) block.

In the second hierarchical stage, the differences between the constant and transient components of the (2×2) base and inspection blocks are summed for each (4×4) block, as follows:

$$Hm=|m1-m1'|+|m2-m2'|+|m3-m3'|+|m4-m4'|$$

$$H\sigma=|1-\sigma1'|+|\sigma2-\sigma2'|+|\sigma3-\sigma3'|+|\sigma4-\sigma4'|$$

Assume that the position of a base block in the second hierarchical stage is (x, y) and that the position of an inspection block is (x+$\Delta$x, y+$\Delta$y) (where $\Delta$x represents a variation of two pixels; $\Delta$y represents a variation of two lines). The above-described feature values can be expressed as follows:

$$Hm(\Delta x, \Delta y)=\Sigma|mi'(x+\Delta x, y+\Delta y)-mi(x, y)|$$

$$H\sigma(\Delta x, \Delta y)=\Sigma|\sigma i'(x+\Delta x, y+\Delta y)-\sigma i(x, y)|$$

These feature amounts are combined to form an evaluating value for the (4×4) block as follows:

$$H(\Delta x, \Delta y)=(w1\cdot Hm(\Delta x, \Delta y))+(w2\cdot H\sigma(\Delta x, \Delta y))$$

The values of $\Delta$x and $\Delta$y corresponding to the position of the minimum evaluating value for the positions of the inspection block considered in the second hierarchical stage comprise the motion vector obtained in the second hierarchical stage.

In the first hierarchical stage shown in FIG. 9A, which is the last part of a motion vector detection operation, one block is represented as an arrangement of (4×4) pixels. The sums of the absolute values of the pixel by pixel differences between the base block and the inspection block comprise the evaluating value for each position of the inspection block.

Motion vector detection in the first hierarchical stage uses the full-search type block matching method. Thus, instead of the sum of differential values, the sum of squares of differential values, the sum of n-th power of absolute values of differential values, or the like may be used as evaluating values.

A specific example of motion vector detection according to the present invention will now be presented.

FIG. 10A, corresponding to the third hierarchical stage, shows a predetermined search range of a reference (preceding) frame and the corresponding portion of a present frame having a shaded (4×4) base block. The predetermined search range, also referred to as the third hierarchical stage search range, is 8×8=64 (4×4) blocks. An inspection block is positioned at each of these block positions in the predetermined search range of the reference frame and a third hierarchical stage evaluating value is obtained at each position of the inspection block. The minimum of the evaluating values is detected. Since there are eight blocks in the horizontal and vertical directions of the predetermined search range, each coordinate of the motion vector of the third hierarchical stage is in the range −4 to +3. In the example shown in FIG. 10A, the minimum evaluating value occurs at the shaded position of the inspection block. The motion vector detected in the third hierarchical stage is (1, −3).

Figure 10D:
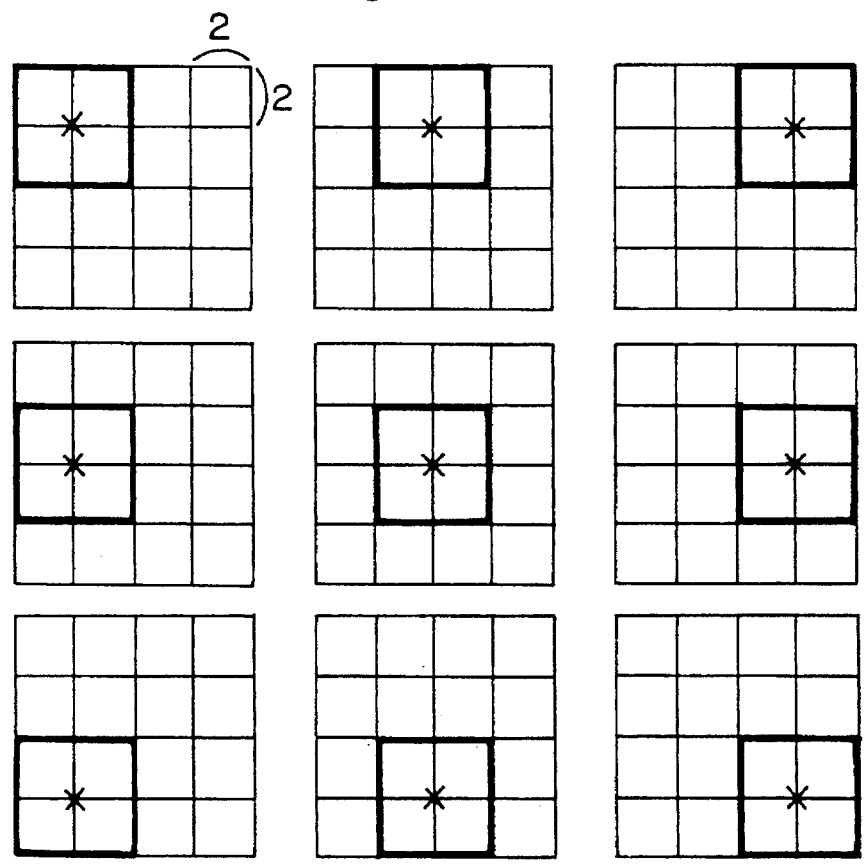

FIG. 10B, corresponding to the second hierarchical stage, shows a portion of the predetermined search range in the vicinity of the best matching block of the third hierarchical stage, as indicated by the motion vector detected in the third hierarchical stage. Specifically, the center of the second hierarchical stage search range in the reference frame is at the position indicated by the motion vector of the third hierarchical stage. The size of the second hierarchical stage search range is four (4×4) blocks, that is, a region centered on the best matching position from the third hierarchical stage and having a width of two inspection blocks and a height of two inspection blocks. As shown in FIG. 10D, with a movement resolution of two pixels and two lines, the (4×4) inspection block is moved through nine possible positions in the second hierarchical stage search range. The centers of each possible position of the inspection block, indicated as an "x" in FIGS. 10B and 10C form a (3×3) grid in the second hierarchical stage search range. At each position of the inspection block, a second hierarchical stage evaluating value is obtained. The minimum of the evaluating values is detected. The local motion vector between the center of the second hierarchical stage search range and the best matching block in the second hierarchical stage, indicated by shading in FIG. 10B, is (−1, −1). The motion vector between the base block and the best matching block in the second hierarchical stage is given by two times the third hierarchical stage motion vector, with the factor of two corresponding to the change in resolution between the third and second hierarchical stages, plus the second hierarchical stage local motion vector:

$$(2\cdot(1, -3))+(-1, -1)=(1, -7)$$

Figure 10E:
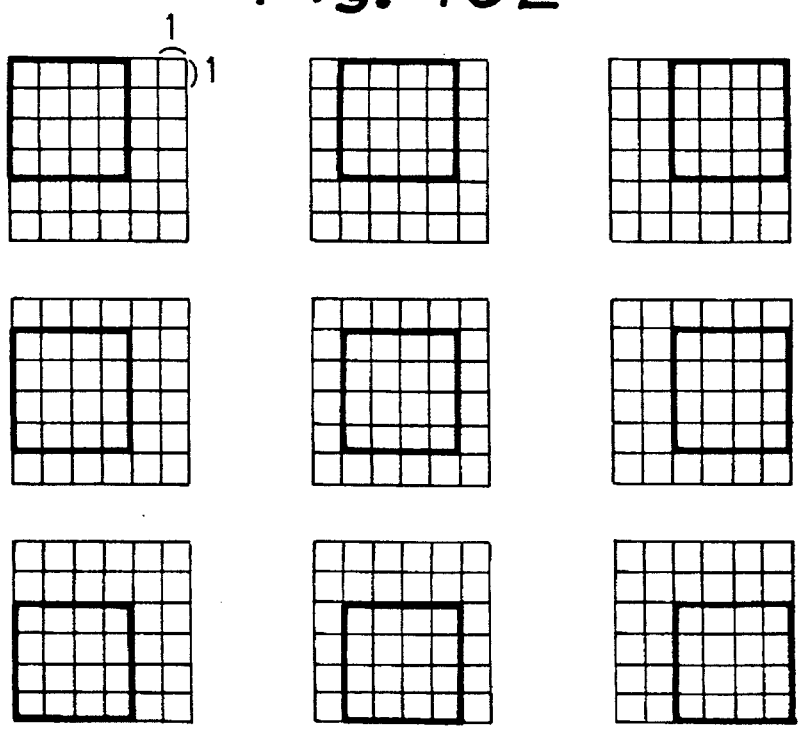

FIG. 10C, corresponding to the first hierarchical stage, shows a portion of the predetermined search range in the vicinity of the best matching block of the second hierarchical stage, as indicated by the motion vector detected in the second hierarchical stage. Specifically, the center of the first hierarchical stage search range in the reference frame is at the position indicated by the motion vector of the second hierarchical stage. The size of the first hierarchical stage search range is (6 pixels×6 lines), that is, a region centered on the best matching position from the second hierarchical stage and having a width of 1.5 inspection blocks and a height of 1.5 inspection blocks. As shown in FIG. 10E, with a movement resolution of one pixel and one line, the (4×4) inspection block is moved through nine possible positions in the first hierarchical stage search range. At each position of the inspection block, a first hierarchical stage evaluating value is obtained. The minimum of the evaluating values is detected. The local motion vector between the center of the first hierarchical stage search range and the best matching block in the first hierarchical stage, indicated by shading in FIG. 10C, is (−1, −1). The motion vector between the base block and the best matching block in the first hierarchical stage is given by two times the second hierarchical stage motion vector, with the factor of two corresponding to the change in resolution between the second and first hierarchical stages, plus the first hierarchical stage local motion vector:

(2·(1, −7))+(−1, −1)=(1, −15)

The number of arithmetic operations in a motion vector detection operation according to the present invention will now be discussed.

In the third hierarchical stage, the number of representative elements of a (4×4) block is two, namely, one mean value and one standard deviation. Since the third hierarchical stage search range comprises 8×8=64 positions of the inspection block, the number of arithmetic operations is 2×64=128.

In the second hierarchical stage, the number of representative elements of a (4×4) block is (four small blocks) ×(two elements per small block)=eight. The second hierarchical stage search range comprises nine positions of the inspection block, so the number of arithmetic operations is 8×9=72.

In the first hierarchical stage, the number of elements in a block is 4×4=16. Since the first hierarchical stage search range comprises nine positions of the inspection block, the number of arithmetic operations is 16×9=144.

Thus, the total number of arithmetic operations in a motion vector detection operation according to the present invention is 128+72+144=344.

In contrast, in the conventional full-search type block matching method, since the number of elements of a block is 16 and the searching range is (32×32=1024), the number of arithmetic operations is (16×1024=16384). Thus, a motion vector detection operation according to the present invention reduces the number of required arithmetic operations by a factor of approximately 1/50.

Figures 2, 11A:
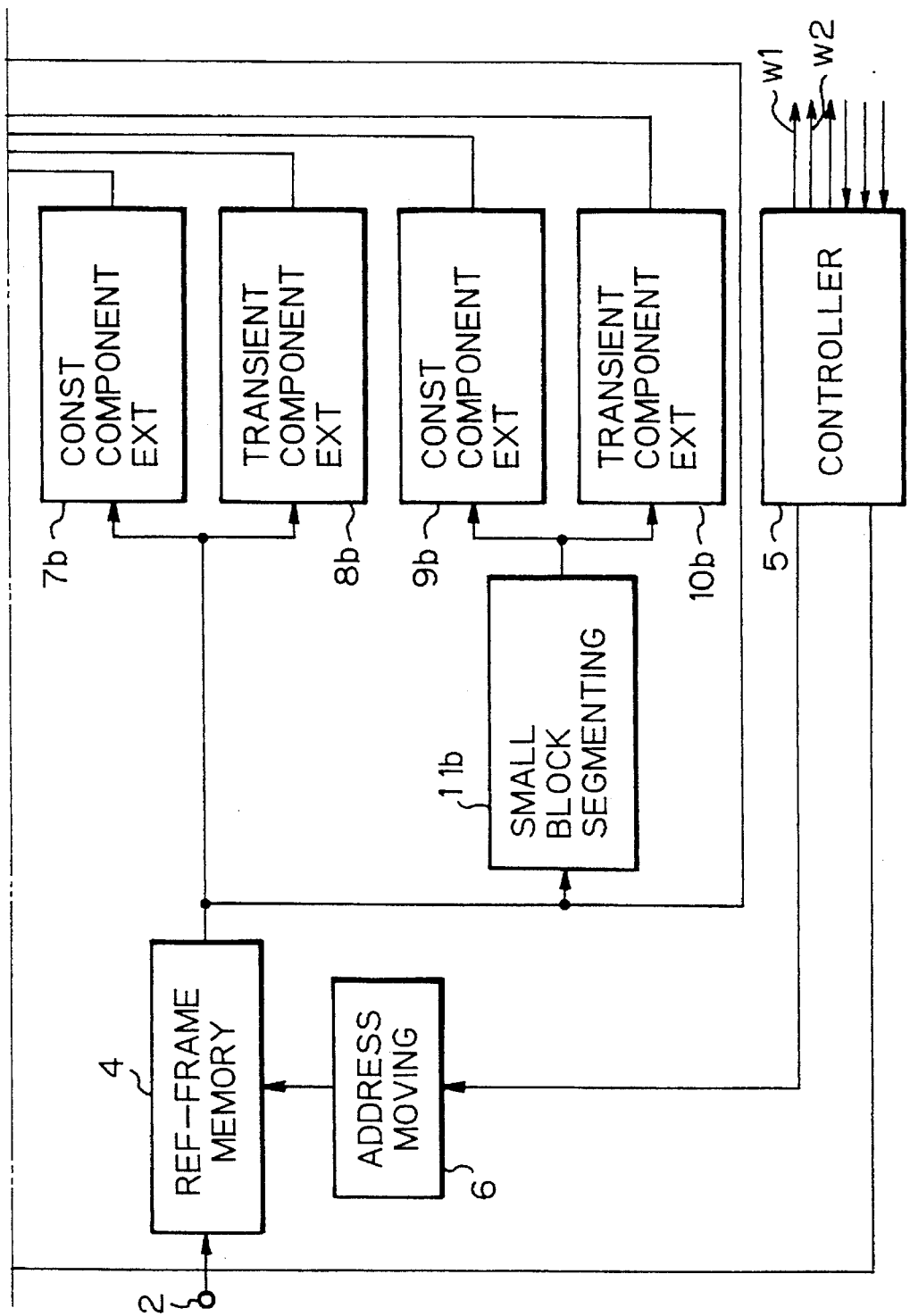
Figure 11B:
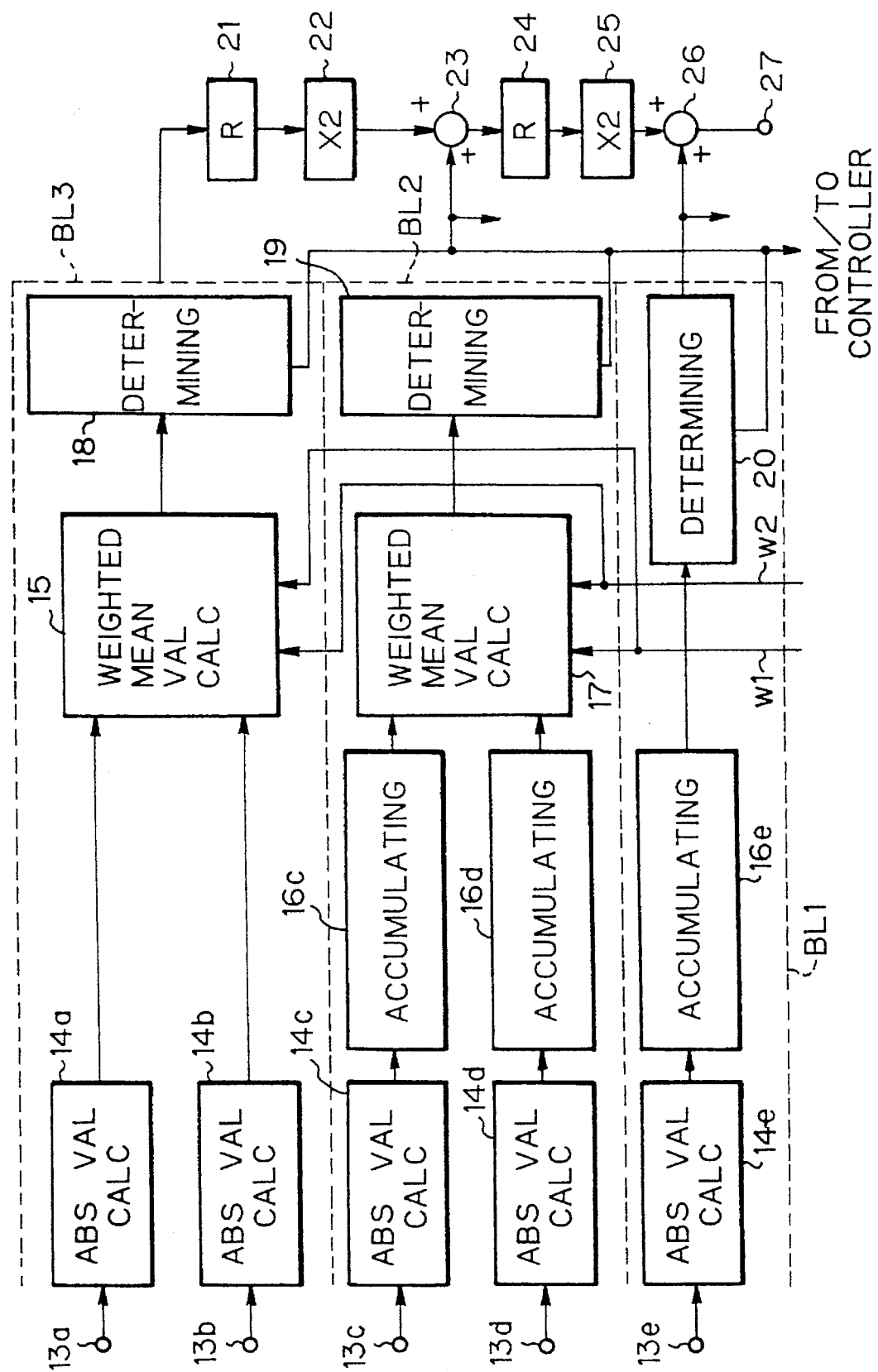

FIGS. 11A and 11B show an embodiment of a motion vector detection circuit according to the present invention.

Image data of a present frame is applied to input terminal 1, which supplies the image data to a present frame memory 3 for storage. Image data for a reference frame is applied to an input terminal 2, which supplies the image data to a reference frame memory 4 for storage.

Controller 5 controls reading and writing of the present frame memory 3 and the reference frame memory 4 which respectively supply pixel data of a base block of the present frame and pixel data of an inspection block of the reference frame to the third, second and first hierarchical stages, as explained below. An address moving circuit 6 is associated with the reference frame memory 4. The controller 5 controls the address moving circuit 6 to apply read addresses to the reference frame memory 4 which move the inspection block in the searching range appropriate for the hierarchical stage for which motion vector detection is being performed.

During the third hierarchical stage, present frame memory 3 supplies pixels of a (4×4) base block to constant component extracting circuit 7a and transient component extracting circuit 7b that respectively obtain feature values for the base block.

During the second hierarchical stage, present frame memory 3 supplies pixels of the (4×4) base block to small block segmenting circuit 11a, which is adapted to divide the base block into four (2×2) blocks and to supply the four small blocks to constant component extracting circuit 9a and transient component extracting circuit 10a that respectively obtain feature values for the small blocks.

During the first hierarchical stage, present frame memory 3 supplies pixels of the (4×4) base block to differential value detecting circuit 12e.

Similarly, during the third hierarchical stage, the reference frame memory 4 supplies pixels of a (4×4) inspection block to constant component extracting circuit 7b and transient component extracting circuit 8b. During the second hierarchical stage, the reference frame memory 4 supplies pixels of the (4×4) inspection block to small block segmenting circuit 11b which supplies small blocks of the inspection block to constant component extracting circuit 9b and transient component extracting circuit 10b. During the first hierarchical stage, the reference frame memory 4 supplies pixels of the (4×4) inspection block to differential value detecting circuit 12e. The circuits 7b, 8b, 11b, 9b and 10b function in a manner corresponding to the circuits 7a, 8a, 11a, 9a and 10a, respectively.

Process block BL3 is operative during the third hierarchical stage and comprises differential value detecting circuits 12a, 12b, shown in FIG. 11A, and absolute value calculating circuits 14a, 14b, weighted mean value calculating circuit 15 and determining circuit 18, shown in FIG. 11B.

Differential value detecting circuit 12a obtains the differential value between the output signals of the constant component extracting circuits 7a and 7b and supplies the differential value to absolute value calculating circuit 14a which obtains the absolute value of the differential value and supplies the absolute value to weighted mean value calculating circuit 15.

Similarly, differential value detecting circuit 12b obtains the differential value between the output signals of the transient component extracting circuits 8a and 8b and supplies the differential value to absolute value calculating circuit 14b which obtains the absolute value of the differential value and supplies the absolute value to weighted mean value calculating circuit 15.

Controller 5 supplies weighting coefficients w1 and w2 to the weighted mean value calculating circuit 15. By experience, the coefficients w1 and w2 may have, for example, the ratio w1/w2=1/(1.5). The coefficient w1 should be increased if the picture has small areas with motion. The coefficient w2 should be increased if the picture has large areas with motion or the camera was moving while the picture was taken.

The weighted mean value calculating circuit 15 is operative to weight the absolute values from the circuits 14a, 14b by the weights w1, w2, respectively, to sum the weighted absolute values to produce a weighted mean value and to supply the weighted mean value as an evaluating value to determining circuit 18.

The determining circuit 18 identifies the minimum evaluating value in the third hierarchical stage search range, namely, the predetermined search range. The best matching block in the third hierarchical search range of the reference frame corresponds to the minimum evaluating value. The determining circuit 18 also produces the third hierarchical stage motion vector between the base block of the present frame and the best matching block in the third hierarchical search range of the reference frame.

The determining circuit 18 supplies the third hierarchical stage motion vector to controller 5 and to register 21. The controller 5 is adapted to use the third hierarchical stage motion vector to determine the center of the second hierarchical stage search range, and to operate address moving circuit 6 to cause read out of inspection blocks from the second hierarchical stage search range.

Process block BL2 is operative during the second hierarchical stage and comprises differential value detecting circuits 12c, 12d, shown in FIG. 11A, and absolute value calculating circuits 14c, 14d, accumulating circuits 16c, 16d, weighted mean value calculating circuit 17 and determining circuit 19, shown in FIG. 11B. Process block BL2 operates in a manner comparable to process block BL3, except that accumulating circuits 16c, 16d sum the absolute values of the difference between the feature values of the small blocks of the base block and the inspection block, and supply the summed results to weighted mean value calculating circuit 17.

The determining circuit 19 supplies the second hierarchical stage motion vector to controller 5 and to adder 23. The controller 5 is adapted to use the second hierarchical stage motion vector to determine the center of the first hierarchical stage search range, and to operate address moving circuit 6 to cause read out of inspection blocks from the first hierarchical stage search range.

Process block BL1 is operative during the first hierarchical stage and comprises differential value detecting circuit 12e, shown in FIG. 11A, and absolute value calculating circuit 14e, accumulating circuit 16e and determining circuit 20, shown in FIG. 11B. Process block BL1 operates in a manner comparable to process block BL2, except that the accumulated absolute values of the differences between the pixels of the base and inspection blocks are applied as an evaluating value directly to determining circuit 20.

The determining circuit 20 supplies the first hierarchical stage motion vector to controller 5 and to adder 26.

Register 21 is operative to supply the third hierarchical stage motion vector to multiplier 22, which may be constructed as a shift circuit, and which functions to multiply the third hierarchical stage motion vector by a factor of two, and to supply the multiplied third hierarchical stage motion vector to adder 23. The adder 23 is adapted to add the multiplied third hierarchical stage motion vector and the second hierarchical stage motion vector, and to supply the added result to register 24.

Register 24 is operative to supply the added result from adder 23 to multiplier 25 which functions to multiply the added result by a factor of two, and to supply the multiplied result to adder 26. The adder 26 is adapted to add the multiplied result from multiplier 25 and the first hierarchical stage motion vector, and to supply the added result to an output terminal 27 as a motion vector between the base block and the best matching block in the predetermined search range.

Figures 2, 12A:
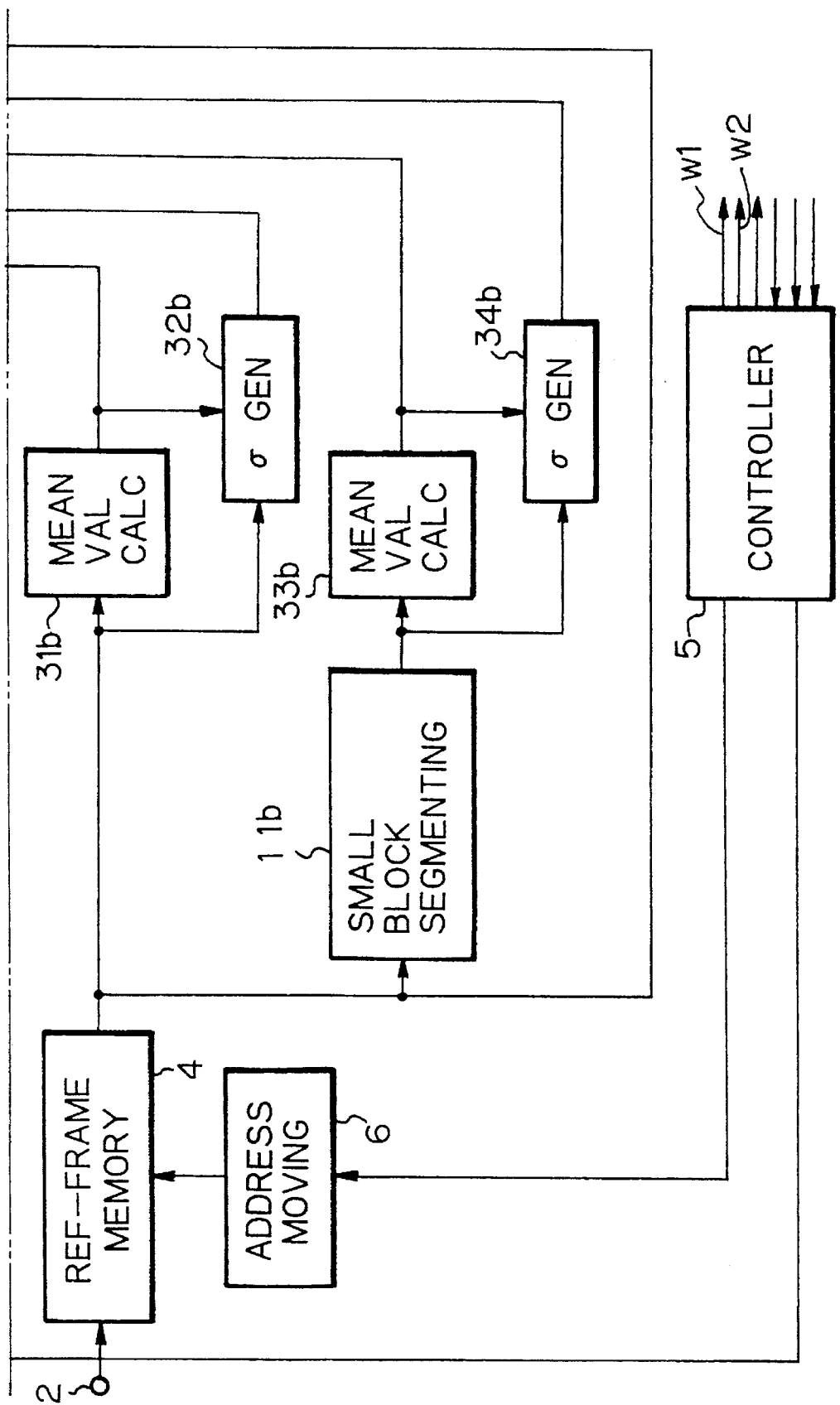
Figure 12B:
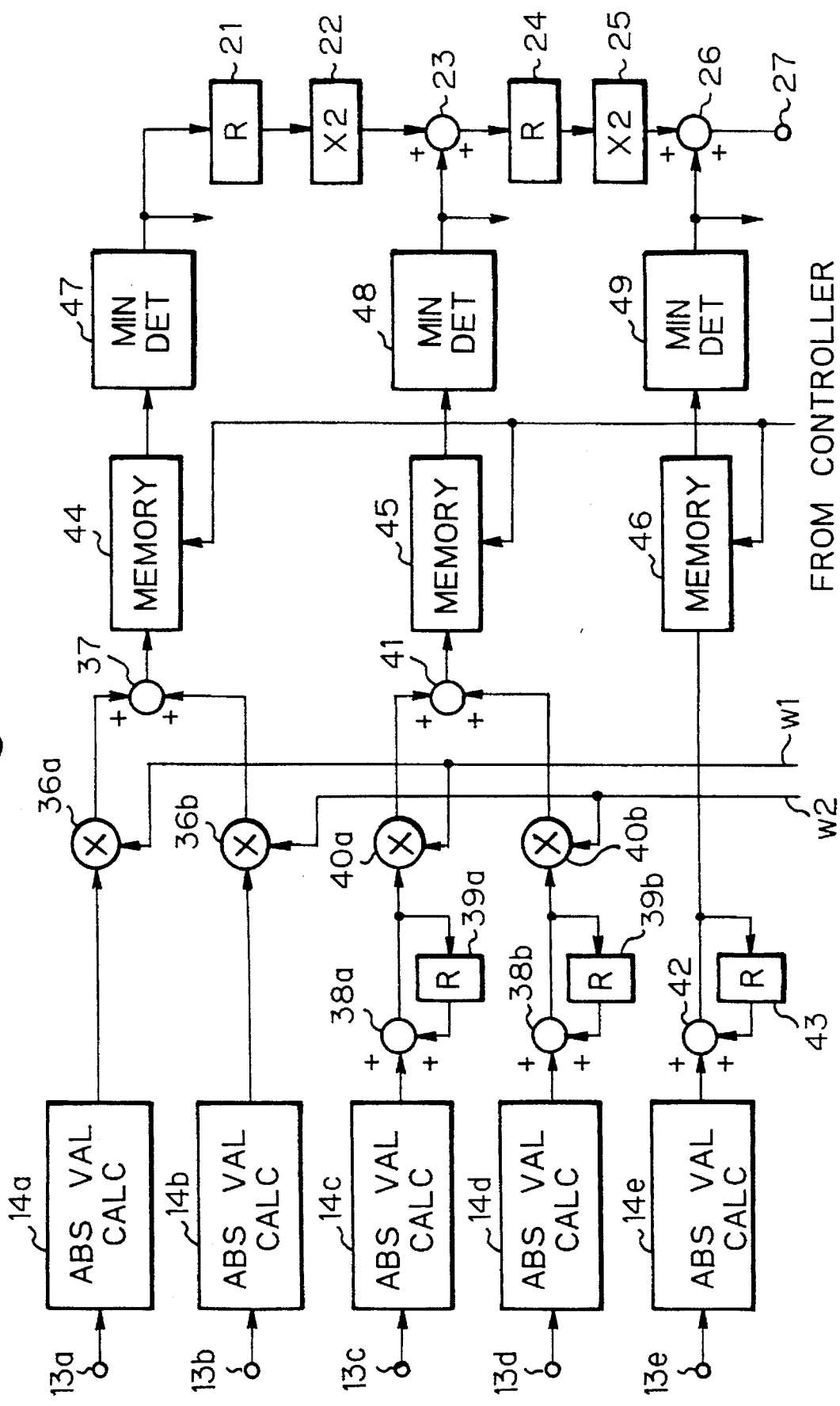

FIGS. 12A and 12B show another embodiment of a motion vector detection circuit according to the present invention.

Mean value calculating circuits 31a, 31b, 33a, 33b of FIG. 12A serve as the constant component extracting circuits 7a, 7b, 9a, 9b of FIG. 11A, respectively. Standard deviation a generating circuits 32a, 32b, 34a, 34b of FIG. 12A serve as transient component extracting circuits 8a, 8b, 10a, 10b of FIG. 11A, respectively. Subtracters 35a to 35e of FIG. 12A serve as differential value detecting circuits 12a to 12e of FIG. 11A, respectively.

The mean value calculating circuits 31a, 31b obtain feature values for the base and inspection blocks in the third hierarchical stage as follows:

$$m=(x1+x2+\ldots+x16)/16$$

$$m'=(x1'+x2'+\ldots+x16')/16$$

The standard deviation generating circuits 32a, 32b obtain feature values for the base and inspection blocks in the third hierarchical stage as follows:

$$\sigma=\{\Sigma(xi-m)^2 \times 1/16\}^{1/2}$$

$$\sigma'=\{\Sigma(xi'-m')^2 \times 1/16\}^{1/2}$$

The mean value calculating circuits 33a, 33b obtain feature values for the base and inspection blocks in the second hierarchical stage as follows:

$$m1=(x1+x2+x5+x6)/4$$

$$m2=(x3+x4+x7+x8)/4$$

$$m3=(x9+x10+x13+x14)/4$$

$$m4=(x11+x12+x15+x16)/4$$

$$m1'=(x1'+x2'+x5'+x6')/4$$

$$m2'=(x3'+x4'+x7'+x8')/4$$

$$m3'=(x9'+x10'+x13'+x14')/4$$

$$m4'=(x11'+x12'+x15'+x16')/4$$

The standard deviation generating circuits 34a, 34b obtain feature values for the base and inspection blocks in the second hierarchical stage as follows:

$$\sigma 1=\{\Sigma(xi-m1)^2 \times 1/4\}^{1/2}$$

$$\sigma 2=\{\Sigma(xi-m2)^2 \times 1/4\}^{1/2}$$

$$\sigma 3=\{\Sigma(xi-m3)^2 \times 1/4\}^{1/2}$$

$$\sigma 4=\{\Sigma(xi-m4)^2 \times 1/4\}^{1/2}$$

$$\sigma 1'=\{\Sigma(xi'-m1')^2 \times 1/4\}^{1/2}$$

$$\sigma 2'=\{\Sigma(xi'-m2')^2 \times 1/4\}^{1/2}$$

$$\sigma 3'=\{\Sigma(xi'-m3')^2 \times 1/4\}^{1/2}$$

$$\sigma 4'=\{\Sigma(xi'-m4')^2 \times 1/4\}^{1/2}$$

where Σ represents the sum of the differences between the values of each (2×2) block and the mean value of the (2×2) block.

Adders 38a, 38b, 42 and registers 39a, 39b, 43 of FIG. 12B, which form respective feedback loops, serve as the accumulating circuits 16c, 16d, and 16e of FIG. 11B, respectively. Multipliers 36a, 36b and adder 37 of FIG. 12B serve as the weighted mean value calculating circuit 15 of FIG. 11B. The multipliers 36a and 36b multiply their input values by weighted coefficients w1 and w2, respectively. The adder 37 adds the outputs of the multipliers 36a and 36b. Multipliers 40a, 40b and adder 41 of FIG. 12B, which function in a similar manner as multipliers 36a, 36b and adder 37, serve as the weighted mean value calculating circuit 17 of FIG. 11B.

The adder 37 outputs the third hierarchical stage evaluating values (w1·|m−mi '|)+(w2·|σ−σ'|).

The adder 41 outputs the second hierarchical stage evaluating values (w1·Σ|mi−mi'|)+(w2·Σ|σi−σi'|), where the summation occurs over the (2×2) small blocks of the (4×4) base and inspection blocks.

The adder 42 outputs the first hierarchical stage evaluating values Σ|xi−xi'|, where the summation occurs over the pixels x1 . . . x16 of the (4×4) base and inspection blocks.

Memory 44 and minimum value detecting circuit 47 of FIG. 12B serve as the determining circuit 18 of FIG. 11B. The memory 44 stores weighted mean value data (evaluating values). The minimum value detecting circuit 47 detects the minimum value of the evaluating values stored in the memory 44 and outputs the third hierarchical stage motion vector corresponding to the position of the minimum value. Similarly, memory 45 and minimum value detecting circuit 48 of FIG. 12B serve as the determining circuit 19 of FIG. 11B, and memory 46 and minimum value detecting circuit 49 of FIG. 12B serve as the determining circuit 20 of FIG. 11B. Memories 45 and 46 each store, for example, nine evaluating values, as explained above with reference to FIGS. 10D and 10E. The memories 44, 45, 46 may be omitted.

Figure 13A:
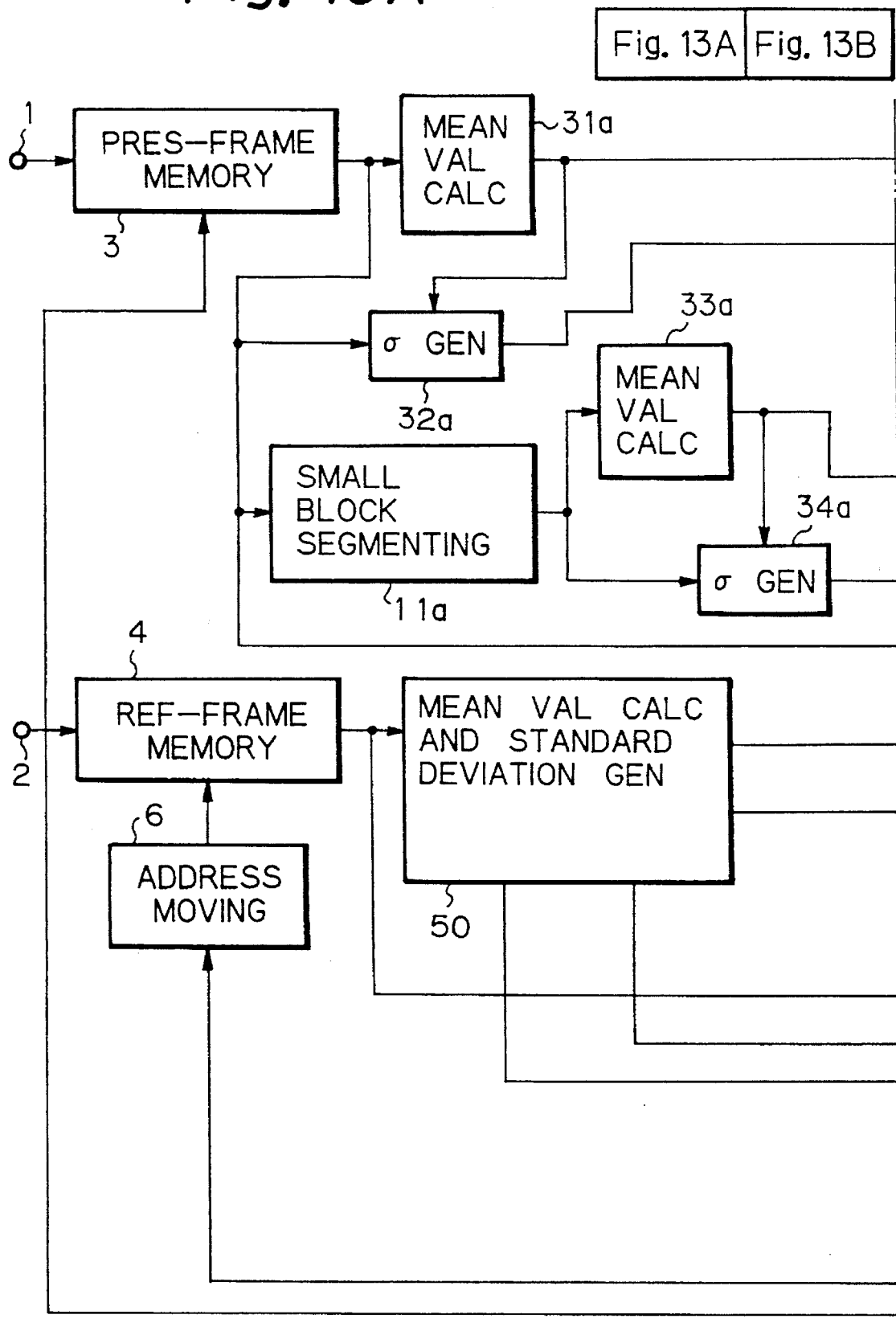
FIGS. 13A and 13B are a block diagram showing another circuit for producing a motion vector according to the present invention.
Figure 13B:
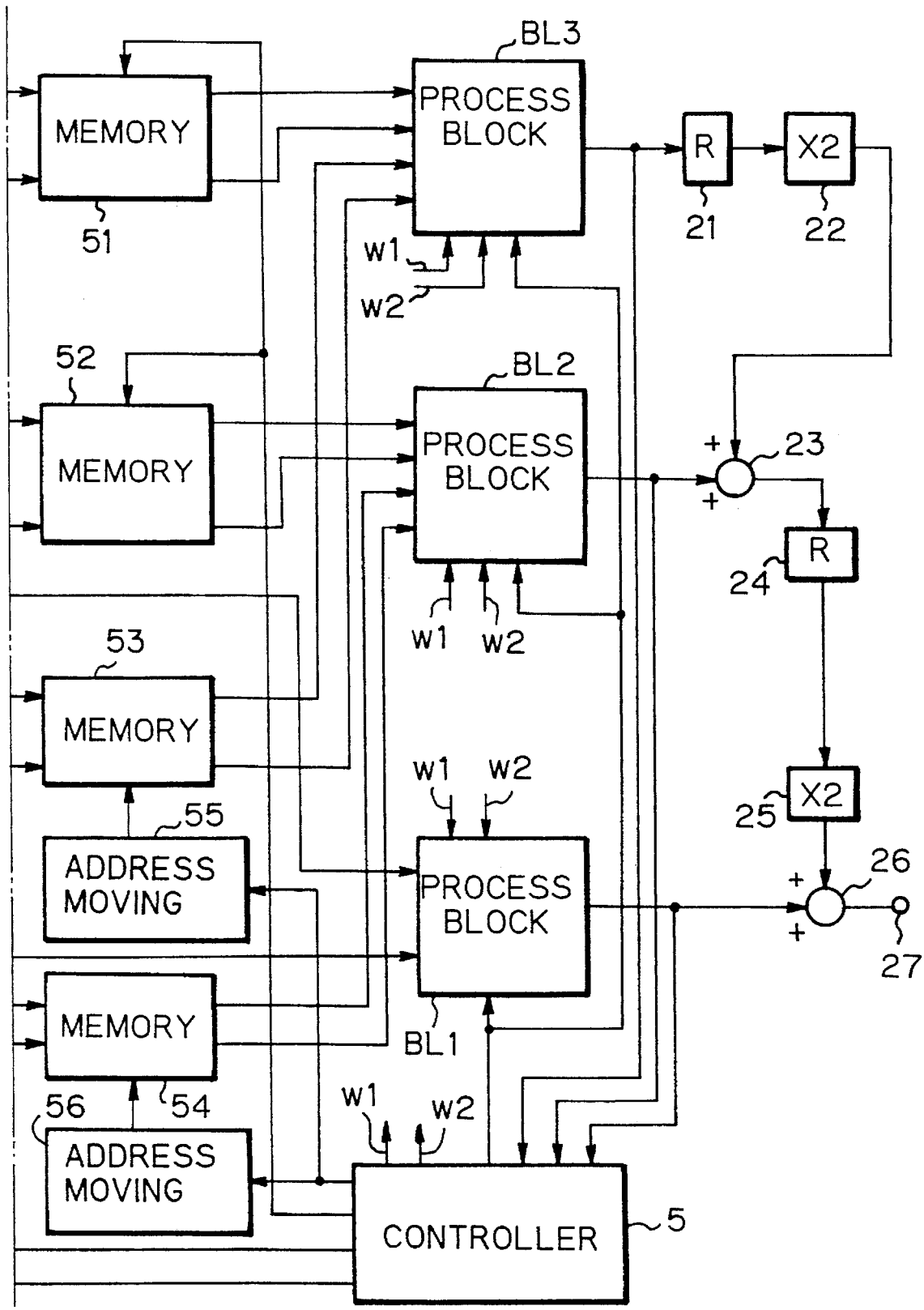

FIG. 13 shows another embodiment of a motion vector detection circuit according to the present invention.

For the third hierarchical stage, present frame memory 3 supplies a (4×4) base block to mean value calculating circuit 31a, which functions to generate a mean value for the base block, and to standard deviation generating circuit 32a, which functions to generate a standard deviation for the base block. The third hierarchical stage mean value and standard deviation are supplied to memory 51 which serves to store these values and to supply them to process block BL3 of FIG. 13. Data is written to and read from the memory 51 under the control of controller 5.

For the second hierarchical stage, present frame memory 3 supplies the (4×4) base block to a small block segmenting circuit 11a that is adapted to divide the base block into four (2×2) small blocks and to supply the small blocks to a mean value calculating circuit 33c, which functions to generate a mean value for each small block, and a standard deviation generating circuit 34a, which functions to generate a standard deviation for each small block. The second hierarchical stage mean values and standard deviations are supplied to memory 52 which serves to store these values and to supply them to process block BL2 of FIG. 13. Data is written to and read from the memory 52 under the control of controller 5.

For the first hierarchical stage, present frame memory 3 supplies the (4×4) base block to process block BL1 of FIG. 13.

Reference frame memory 4 supplies (4×4) inspection block data in a similar manner as present frame memory 3 to similar circuits which are indicated, for simplicity, as a circuit block 50. Memories 53 and 54 serve to store the mean values and standard deviations for the third and second hierarchical stages, respectively. Memories 53 and 54 also serve to supply the data stored therein to process blocks BL3 and BL2 of FIG. 13, respectively. Address moving circuits 55 and 56 are provided in association with the memories 53 and 54, respectively, so that the inspection block may be located at different positions within the third and second hierarchical stage search ranges. Data write/read operations and address moving operations for the memories 53 and 54 are controlled by the controller 5. All data in the predetermined (third hierarchical stage) search range may be stored in the memories 53 and 54. Alternatively, the memory 54 may store only data in the second hierarchical stage search range, that is, data for four (4×4) blocks centered at the position indicated by the third hierarchical stage motion vector. Reference frame memory 4 also supplies the (4×4) inspection block to process block BL1 of FIG. 13.

The process blocks BL3, BL2, BL1 of FIG. 13 function in a comparable manner to the process blocks BL3, BL2, BL1 of FIGS. 11A and 11B, to produce third, second and first hierarchical stage motion vectors, respectively, which are combined as shown in FIGS. 11A and 11b to produce a final motion vector at output terminal 27.

The present invention can also be applied when a motion vector is detected between two still images or when a motion vector is detected between images with different resolutions.

In the embodiments of the present invention described above, the processing for each of the hierarchical stages is performed by similar circuit constructions. Alternatively, since processing for each of the hierarchical stages occurs at substantially different times, one general circuit block may be shared among the hierarchical stages.

It will be apparent to one of ordinary skill in the art that evaluating values may be generated and motion vectors may be detected by software processes.

Instead of mean values and standard deviations, constant components and transient components corresponding to levels of frequency components, order number of orthogonal variations, or the like may be used in each hierarchical stage.

The first hierarchical stage motion vector may be obtained at an accuracy of one half-pixel rather than one pixel.

In the above-described embodiments, the number of hierarchical stages is three. However, the number of hierarchical stages may be any number larger than two.

A thin-out operation may be additionally be performed. For example, in the third hierarchical stage, a (4×4) block may be represented by a DC pixel in the upper left corner of the block, x1, and the mean value of the absolute values of the differences between the DC pixel and the remaining fifteen pixels in the block, $(\Sigma|xi-x1|)/15$, i=2 to 16. In the second hierarchical stage, the (4×4) block may be segmented into four (2×2) small blocks, and each of the small blocks may be represented by a DC pixel in the upper left corner of the block, x1, and the mean value of the absolute values of the differences between the DC pixel and the remaining three pixels in the block, $(\Sigma|xi-x1|)/3$, i=2 to 4. The constant component is the DC pixel and the transient component is the mean value.

The present invention may be applied in a construction where a thin-out process is accomplished with a low-pass filter and a sub-sampling circuit. In other words, a constant component in each hierarchical stage is formed by supplying original image data in the first hierarchical stage to a low-pass filter and a sub-sampling circuit. A transient component in each hierarchical stage comprises a standard deviation or the like that is calculated for every predetermined quantity of pixel data of the original image data.

According to the present invention, motion vectors can be detected with a substantially reduced number of arithmetic operations due to hierarchical processing.

The use of both constant and transient components of original image data in the higher (lower resolution) hierarchical stages reduces occurrences of errors in the motion vector detection process.

According to the present invention, with a mean value calculating circuit, a thin-out circuit, and a low-pass filter, image data in hierarchical construction is formed so as to reduce the number of elements representing a block and to simplify the searching process for the best matching block.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A motion vector detecting apparatus, comprising:

means for supplying image data of a base block of a first image;

first extracting means for obtaining a constant component and a transient component of said base block;

means for supplying image data of an inspection block of a second image in response to a control signal;

second extracting means for obtaining a constant component and a transient component of said inspection block;

first comparison means for comparing said constant and transient components of said base and inspection blocks to determine a first position of said inspection block in said second image which best matches said base block;

means for indicating different positions in said second image as said control signal as a function of the first best matching position of said inspection block; and second comparison means for comparing said image data of said base block and said image data of said inspection block as the position of said inspection block is varied in the neighborhood of said first best matching position to determine a second position of said inspection block in said neighborhood of said first best matching position which best matches said base block.

2. The apparatus of claim 1, further comprising first memory means for storing and reading out said base block, and second memory means for storing a predetermined search range of said second image and reading out said inspection block.

3. The apparatus of claim 1, wherein said first extracting means includes first constant component extracting means for obtaining said constant component from said base block and first transient component extracting means for obtaining said transient component from said base block, and said second extracting means includes second constant component extracting means for obtaining said constant component from said inspection block and second transient component extracting means for obtaining said transient component from said inspection block.

4. The apparatus of claim 1, wherein said first comparison means includes first difference means for obtaining a first difference between said constant component of said base block and said constant component of said inspection block, second difference means for obtaining a second difference between said transient component of said base block and said transient component of said inspection block, and determining means for determining the first best matching position of said inspection block in said second image as a function of said first and second differences.

5. The apparatus of claim 4, wherein said determining means includes first absolute value means for producing an absolute value of said first difference, second absolute value means for producing an absolute value of said second difference, and means for adding the absolute values of said first and second differences.

6. The apparatus of claim 5, wherein said means for adding includes first multiplying means for multiplying said absolute value of said first difference by a first weighting value and second multiplying means for multiplying said absolute value of said second difference by a second weighting value.

7. The apparatus of claim 1, wherein said second comparison means includes difference means for obtaining differences between said image data of said base and inspection blocks, and determining means for determining the second best matching position of said inspection block in said second image as a function of said differences.

8. The apparatus of claim 7, wherein said determining means includes absolute value means for producing respective absolute values of said differences, and accumulating means for combining said respective absolute values.

9. The apparatus of claim 1, wherein said first comparison means is also operative to produce a first motion vector between said base block and said first best matching position.

10. The apparatus of claim 9, wherein said second comparison means is also operative to produce a second motion vector between said base block and said second best matching position.

11. The apparatus of claim 10, further comprising means for multiplying said first motion vector by a predetermined factor and means for adding the multiplied first motion vector to said second motion vector to produce a final motion vector between said base block and said second best matching position.

12. The apparatus of claim 1, further comprising small block forming means for forming said base block and said inspection block into respective small blocks, for supplying the small blocks of said base block to said first extracting means and for supplying the small blocks of said inspection block to said second extracting means.

13. The apparatus of claim 12, wherein said first comparison means includes first difference means for obtaining first differences between the constant components of said small blocks of said base block and said inspection block, first accumulating means for combining said first differences to produce a first cumulative difference, second difference means for obtaining second differences between the transient components of said small blocks of said base block and said inspection block, second accumulating means for combining said second differences to produce a second cumulative difference, and determining means for determining the best matching position of said inspection block in said second image as a function of said first and second cumulative differences.

14. The apparatus of claim 13, wherein said determining means includes first multiplying means for multiplying said first cumulative difference by a first weighting value, second multiplying means for multiplying said second cumulative difference by a second weighting value, and means for adding the weighted first and second cumulative differences.

15. The apparatus of claim 1, wherein said base and inspection blocks comprise pixels having respective values, said constant component of said base block is a mean value of said pixels of said base block and said constant component of said inspection block is a mean value of said pixels of said inspection block.

16. The apparatus of claim 1, wherein said base and inspection blocks comprise pixels having respective values, said constant component of said base block is one of a low frequency component of said pixels of said base block, low order component of a set of orthogonally transformed coefficients corresponding to said pixels of said base block, maximum value of said pixels of said base block, and minimum value of said pixels of said base block, and said constant component of said inspection block is one of a low frequency component of said pixels of said inspection block, low order component of a set of orthogonally transformed coefficients corresponding to said pixels of said inspection block, maximum value of said pixels of said inspection block, and minimum value of said pixels of said inspection block.

17. The apparatus of claim 1, wherein said base and inspection blocks comprise pixels having respective values, said transient component of said base block is a standard deviation of said pixels of said base block and said transient component of said inspection block is a standard deviation of said pixels of said inspection block.

18. The apparatus of claim 1, wherein said base and inspection blocks comprise pixels having respective values, said transient component of said base block is one of a high frequency component of said pixels of said base block, high order component of a set of orthogonally transformed coefficients corresponding to said pixels of said base block, dynamic range of said pixels of said base block, difference of mean values of said pixels of said base block, and maximum value of differences of mean values of said pixels of said base block, and said transient component of said inspection block is one of a high frequency component of said pixels of said inspection block, high order component of a set of orthogonally transformed coefficients corresponding to said pixels of said inspection block, dynamic range of said pixels of said inspection block, difference of mean values of said pixels of said inspection block, and maximum value of differences of mean values of said pixels of said inspection block.

19. The apparatus of claim 1, wherein said neighborhood of said first best matching position is a region centered on said first best matching position and having a width of two inspection blocks and a height of two inspection blocks.

20. The apparatus of claim 1, wherein said neighborhood of said first best matching position is a region centered on said first best matching position and having a width of 1.5 inspection blocks and a height of 1.5 inspection blocks.

21. The apparatus of claim 1, further comprising small block forming means for forming said base block and said inspection block into respective small blocks, third extracting means for obtaining a constant component and a transient component of the respective small blocks of said base block, fourth extracting means for obtaining a constant component and a transient component of the respective small blocks of said inspection block, and third comparison means for comparing said constant and transient components of said small blocks of said base and inspection blocks as the position of said inspection block is varied in the neighborhood of said first best matching position to determine a third position of said inspection block in said second image which best matches said base block; and wherein said means for indicating is also operative to indicate different positions in said second image as said control signal as a function of the third best matching position of said inspection block, and said second comparison means is operative to determine the second best matching position as the position of said inspection block is varied in the neighborhood of said third best matching position.

22. The apparatus of claim 21, wherein
said first comparison means includes first difference means for obtaining a first difference between said constant component of said base block and said constant component of said inspection block, second difference means for obtaining a second difference between said transient component of said base block and said transient component of said inspection block, and first determining means for determining the first best matching position of said inspection block in said second image as a function of said first and second differences;

said third comparison means includes third difference means for obtaining third differences between the constant components of said small blocks of said base block and said inspection block, first accumulating means for combining said third differences to produce a first cumulative difference, fourth difference means for obtaining fourth differences between the transient components of said small blocks of said base block and said inspection block, second accumulating means for combining said fourth differences to produce a second cumulative difference, and second determining means for determining the best matching position of said inspection block in said second image as a function of said first and second cumulative differences; and said second comparison means includes fifth difference means for obtaining fifth differences between said image data of said base and inspection blocks, and third determining means for determining the second best matching position of said inspection block in said second image as a function of said fifth differences.

23. The apparatus of claim 21, wherein said first comparison means is also operative to produce a first motion vector between said base block and said first best matching position, said second comparison means is also operative to produce a second motion vector between said base block and said second best matching position, said third comparison means is also operative to produce a third motion vector between said base block and said third best matching position; and further comprising first multiplying means for multiplying said first motion vector by a first predetermined factor, first adding means for adding the multiplied first motion vector to said third motion vector to produce an intermediate motion vector, second multiplying means for multiplying said intermediate motion vector by a second predetermined factor, and second adding means for adding the multiplied intermediate motion vector to said second motion vector to produce a final motion vector between said base block and said second best matching position.

24. A motion vector detecting apparatus, comprising:
means for supplying image data of a base block of a first image;

first extracting means for obtaining a constant component and a transient component of said base block;

means for supplying image data of an inspection block of a second image in response to a control signal;

second extracting means for obtaining a constant component and a transient component of said inspection block;

first comparison means for comparing said constant and transient components of said base and inspection blocks to determine a first position of said inspection block in said second image which best matches said base block;

means for indicating different positions in said second image as said control signal as a function of the first best matching position of said inspection block;

first small block forming means for forming said base block into first small blocks;

third extracting means for obtaining a constant component and a transient component of each of the first small blocks;

second small block forming means for forming said inspection block into second small blocks as the position of said inspection block is varied in the neighborhood of said first best matching position;

fourth extracting means for obtaining a constant component and a transient component of each of the second small blocks; and second comparison means for comparing said constant and transient components of said first and second small blocks to determine a second position of said inspection block in said second image which best matches said base block.

25. The apparatus of claim 24, wherein said first comparison means is also operative to produce a first motion vector between said base block and said first best matching position, said second comparison means is also operative to produce a second motion vector between said base block and said second best matching position; and further comprising multiplying means for multiplying said first motion vector by a predetermined factor, and adding means for adding the multiplied first motion vector to said second motion vector to produce a final motion vector between said base block and said second best matching position.

26. A motion vector detecting method, comprising the steps of:
  supplying image data of a base block of a first image;
  obtaining a constant component and a transient component of said base block;
  supplying image data of an inspection block of a second image in response to a control signal;
  obtaining a constant component and a transient component of said inspection block;
  comparing said constant and transient components of said base and inspection blocks to determine a first position of said inspection block in said second image which best matches said base block;
  indicating different positions in said second image as said control signal as a function of the first best matching position of said inspection block; and
  comparing said image data of said base block and said image data of said inspection block as the position of said inspection block is varied in the neighborhood of said first best matching position to determine a second position of said inspection block in said neighborhood of said first best matching position which best matches said base block.

27. The method of claim 26, further comprising the steps of storing and reading out said base block, storing a predetermined search range of said second image and reading out said inspection block.

28. The method of claim 26, wherein the step of obtaining a constant component and a transient component of said base block includes obtaining said constant component from said base block and obtaining said transient component from said base block, and the step of obtaining a constant component and a transient component of said inspection block includes obtaining said constant component from said inspection block and obtaining said transient component from said inspection block.

29. The method of claim 26, wherein the step of comparing said constant and transient components of said base and inspection blocks includes obtaining a first difference between said constant component of said base block and said constant component of said inspection block, obtaining a second difference between said transient component of said base block and said transient component of said inspection block, and determining the first best matching position of said inspection block in said second image as a function of said first and second differences.

30. The method of claim 29, wherein the step of determining includes producing an absolute value of said first difference, producing an absolute value of said second difference, and adding the absolute values of said first and second differences.

31. The method of claim 30, wherein the step of adding includes multiplying said absolute value of said first difference by a first weighting value and multiplying said absolute value of said second difference by a second weighting value.

32. The method of claim 26, wherein the step of comparing said image data of said base block and said image data of said inspection block includes obtaining differences between said image data of said base and inspection blocks, and determining the second best matching position of said inspection block in said second image as a function of said differences.

33. The method of claim 32, wherein the step of determining includes producing respective absolute values of said differences, and combining said respective absolute values.

34. The method of claim 26, further comprising the step of producing a first motion vector between said base block and said first best matching position.

35. The method of claim 34, further comprising the step of producing a second motion vector between said base block and said second best matching position.

36. The method of claim 35, further comprising the steps of multiplying said first motion vector by a predetermined factor and adding the multiplied first motion vector to said second motion vector to produce a final motion vector between said base block and said second best matching position.

37. The method of claim 26, further comprising the steps of forming said base block and said inspection block into respective small blocks, supplying the small blocks of said base block to said first extracting means and supplying the small blocks of said inspection block to said second extracting means.

38. The method of claim 37, wherein the step of comparing said constant and transient components of said base and inspection blocks includes obtaining first differences between the constant components of said small blocks of said base block and said inspection block, combining said first differences to produce a first cumulative difference, obtaining second differences between the transient components of said small blocks of said base block and said inspection block, combining said second differences to produce a second cumulative difference, and determining the best matching position of said inspection block in said second image as a function of said first and second cumulative differences.

39. The method of claim 38, wherein the step of determining the best matching position includes multiplying said first cumulative difference by a first weighting value, multiplying said second cumulative difference by a second weighting value, and adding the weighted first and second cumulative differences.

40. The method of claim 26, wherein said base and inspection blocks comprise pixels having respective values, said constant component of said base block is a mean value of said pixels of said base block and said constant component of said inspection block is a mean value of said pixels of said inspection block.

41. The method of claim 26, wherein said base and inspection blocks comprise pixels having respective values, said constant component of said base block is one of a low frequency component of said pixels of said base block, low order component of a set of orthogonally transformed coefficients corresponding to said pixels of said base block, maximum value of said pixels of said base block, and minimum value of said pixels of said base block, and said constant component of said inspection block is one of a low frequency component of said pixels of said inspection block, low order component of a set of orthogonally transformed coefficients corresponding to said pixels of said inspection block, maximum value of said pixels of said inspection block, and minimum value of said pixels of said inspection block.

42. The method of claim 26, wherein said base and inspection blocks comprise pixels having respective values, said transient component of said base block is a standard deviation of said pixels of said base block and said transient component of said inspection block is a standard deviation of said pixels of said inspection block.

43. The method of claim 26, wherein said base and inspection blocks comprise pixels having respective values, said transient component of said base block is one of a high frequency component of said pixels of said base block, high order component of a set of orthogonally transformed coefficients corresponding to said pixels of said base block, dynamic range of said pixels of said base block, difference of mean values of said pixels of said base block, and maximum value of differences of mean values of said pixels of said base block, and said transient component of said inspection block is one of a high frequency component of said pixels of said inspection block, high order component of a set of orthogonally transformed coefficients corresponding to said pixels of said inspection block, dynamic range of said pixels of said inspection block, difference of mean values of said pixels of said inspection block, and maximum value of differences of mean values of said pixels of said inspection block.

44. The method of claim 26, wherein said neighborhood of said first best matching position is a region centered on said first best matching position and having a width of two inspection blocks and a height of two inspection blocks.

45. The method of claim 26, wherein said neighborhood of said first best matching position is a region centered on said first best matching position and having a width of 1.5 inspection blocks and a height of 1.5 inspection blocks.

46. The method of claim 26, further comprising the steps of forming said base block and said inspection block into respective small blocks, obtaining a constant component and a transient component of the respective small blocks of said base block, obtaining a constant component and a transient component of the respective small blocks of said inspection block, comparing said constant and transient components of said small blocks of said base and inspection blocks as the position of said inspection block is varied in the neighborhood of said first best matching position to determine a third position of said inspection block in said second image which best matches said base block, and indicating different positions in said second image as said control signal as a function of the third best matching position of said inspection block; and wherein the step of comparing determines the second best matching position as the position of said inspection block is varied in the neighborhood of said third best matching position.

47. The method of claim 46, wherein
the step of comparing said constant and transient components of said base and inspection blocks includes obtaining a first difference between said constant component of said base block and said constant component of said inspection block, obtaining a second difference between said transient component of said base block and said transient component of said inspection block, and determining the first best matching position of said inspection block in said second image as a function of said first and second differences;

the step of comparing said constant and transient components of said small blocks of said base and inspection blocks includes obtaining third differences between the constant components of said small blocks of said base block and said inspection block, combining said third differences to produce a first cumulative difference, obtaining fourth differences between the transient components of said small blocks of said base block and said inspection block, combining said fourth differences to produce a second cumulative difference, and determining the best matching position of said inspection block in said second image as a function of said first and second cumulative differences; and the step of comparing said image data of said base block and said image data of said inspection block includes obtaining fifth differences between said image data of said base and inspection blocks, and determining the second best matching position of said inspection block in said second image as a function of said fifth differences.

48. The method of claim 46, further comprising the steps of producing a first motion vector between said base block and said first best matching position, producing a second motion vector between said base block and said second best matching position, producing a third motion vector between said base block and said third best matching position, multiplying said first motion vector by a first predetermined factor, adding the multiplied first motion vector to said third motion vector to produce an intermediate motion vector, multiplying said intermediate motion vector by a second predetermined factor, and adding the multiplied intermediate motion vector to said second motion vector to produce a final motion vector between said base block and said second best matching position.

49. A motion vector detecting method, comprising the steps of:
supplying image data of a base block of a first image;
obtaining a constant component and a transient component of said base block;
supplying image data of an inspection block of a second image in response to a control signal;
obtaining a constant component and a transient component of said inspection block;
comparing said constant and transient components of said base and inspection blocks to determine a first position of said inspection block in said second image which best matches said base block;
indicating different positions in said second image as said control signal as a function of the first best matching position of said inspection block;
forming said base block into first small blocks;
obtaining a constant component and a transient component of each of the first small blocks;
forming said inspection block into second small blocks as the position of said inspection block is varied in the neighborhood of said first best matching position;
obtaining a constant component and a transient component of each of the second small blocks; and
comparing said constant and transient components of said first and second small blocks to determine a second position of said inspection block in said second image which best matches said base block.

50. The method of claim 49, further comprising the steps of producing a first motion vector between said base block and said first best matching position, producing a second motion vector between said base block and said second best matching position, multiplying said first motion vector by a predetermined factor, and adding the multiplied first motion vector to said second motion vector to produce a final motion vector between said base block and said second best matching position.

* * * * *